United States Patent
Chivarov et al.

(10) Patent No.: US 7,694,907 B2
(45) Date of Patent: Apr. 13, 2010

(54) LARGE ARBOR FLY FISHING REEL, SPOOL, DRAG AND VENTILATION SYSTEM

(75) Inventors: Georgi Chivarov, Kapuzinerstrasse 40, Munich (DE) 80469; Stefan Chivarov, Munich (DE)

(73) Assignee: Georgi Chivarov, Munich (DE)

( * ) Notice: Subject to any disclaimer, the term of this patent is extended or adjusted under 35 U.S.C. 154(b) by 0 days.

(21) Appl. No.: 12/282,327

(22) PCT Filed: Mar. 12, 2007

(86) PCT No.: PCT/EP2007/002136
§ 371 (c)(1),
(2), (4) Date: Sep. 9, 2008

(87) PCT Pub. No.: WO2007/104508
PCT Pub. Date: Sep. 20, 2007

(65) Prior Publication Data
US 2009/0090802 A1 Apr. 9, 2009

(30) Foreign Application Priority Data
Mar. 10, 2006 (DE) .................. 10 2006 011 267
Dec. 15, 2006 (DE) .................. 10 2006 059 385

(51) Int. Cl.
*A01K 89/016* (2006.01)
*A01K 89/033* (2006.01)

(52) U.S. Cl. .............. 242/303; 242/304; 242/285; 242/291; 242/295

(58) Field of Classification Search .............. 245/295, 245/317, 303, 301, 304, 285, 290, 291, 294
See application file for complete search history.

(56) References Cited

U.S. PATENT DOCUMENTS

| | | | |
|---|---|---|---|
| 3,478,977 A | | 11/1969 | Sarah |
| 4,750,687 A | * | 6/1988 | Sievert et al. ............... 242/295 |
| 4,883,238 A | * | 11/1989 | Harder ...................... 242/317 |
| 5,857,632 A | * | 1/1999 | Arkowski ................... 242/297 |
| 6,209,815 B1 | | 4/2001 | Collier |
| 6,296,200 B1 | | 10/2001 | Chang |
| 6,382,544 B1 | * | 5/2002 | Park ........................ 242/303 |
| 6,382,545 B1 | * | 5/2002 | Yeh .......................... 242/317 |
| 6,508,426 B1 | * | 1/2003 | Whittle-Herbert .......... 242/317 |
| 6,732,965 B2 | * | 5/2004 | Bascue, Jr. ................. 242/304 |
| 6,964,388 B1 | * | 11/2005 | Ritter ....................... 242/291 |
| 6,964,389 B2 | * | 11/2005 | Hill et al. .................... 242/301 |
| 7,431,232 B1 | * | 10/2008 | Kang ........................ 242/303 |
| 2001/0038053 A1 | | 11/2001 | Vashro |
| 2004/0061011 A1 | * | 4/2004 | Gilmore ..................... 242/317 |

* cited by examiner

*Primary Examiner*—Evan H Langdon
(74) *Attorney, Agent, or Firm*—Baker & Hostetler LLP

(57) ABSTRACT

A large arbor anti-reverse fly fishing reel provides by its handle a convenient variable drug control up to a present drag force. The drag knob is preferably designed as a four-vane propeller knob being arranged within a handle depression extending inside the spool. By means of a bayonet coupling, which also serves as a variable drag control device, the handle can be securely attached to the reel thereby locking the spool. The spool can be provided with omega-like perforations for a maximum stability, lightness and ventilation, said ventilation being optionally enhanced by an air turbine formed by said perforation and a portion of the frame and/or a portion of the handle extending inside the spool.

33 Claims, 11 Drawing Sheets

FIG. 25
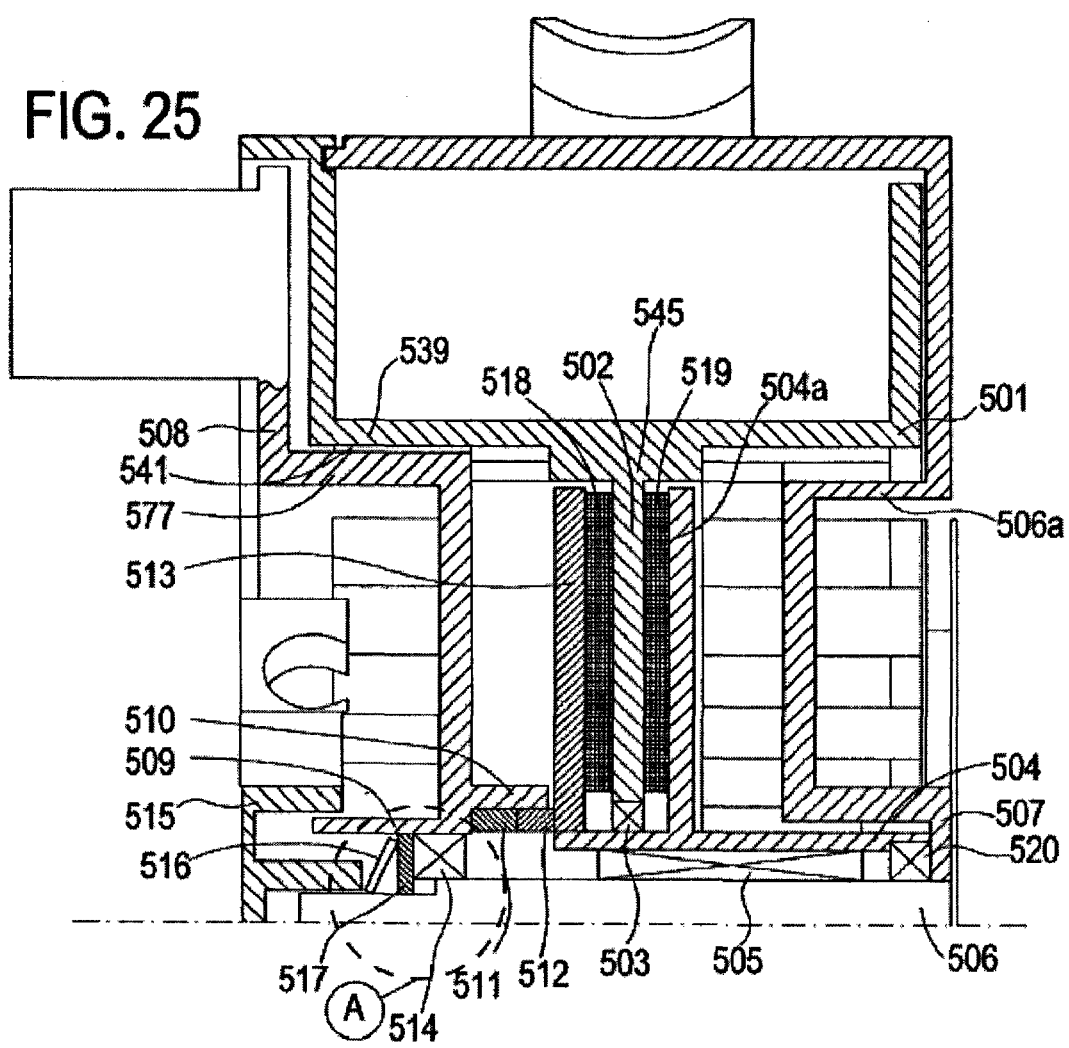
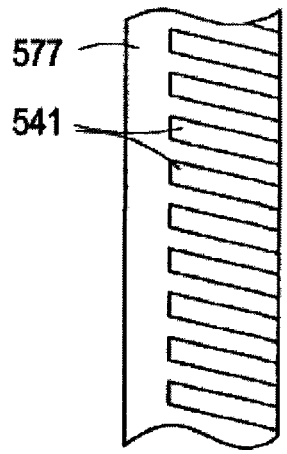
FIG. 27
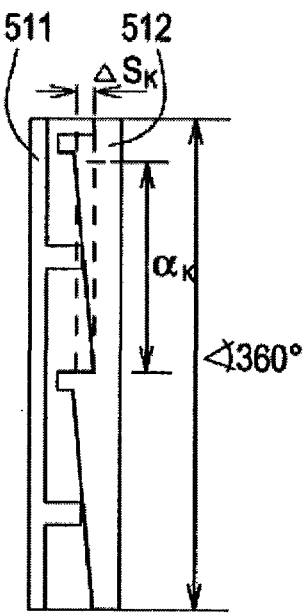
FIG. 26
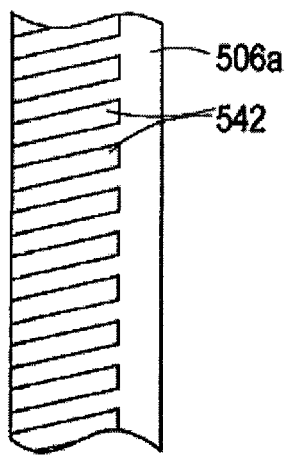
FIG. 28

LARGE ARBOR FLY FISHING REEL, SPOOL, DRAG AND VENTILATION SYSTEM

FIELD OF THE INVENTION

This invention relates to a large arbor fly fishing reel and more particularly to an anti-reverse fly fishing reel, an improved spool, a drag system for applying an appropriate variable drag force and an efficient ventilation system.

BACKGROUND OF THE INVENTION

Fly fishing requires quite complex functional features from a reel, especially an easy pay-out of line for preparing a casting, an instant but softly ongoing drag increase to stop a sudden fish run, a comfortable dynamic adjustment of the drag when fighting the fish depending on the strategy desired by the angler, when necessary by applying a maximum drag load, an easy switching between this passive braking mode and a mode of winding line in, and all this while having the permanent security that the load on the line will never exceed the line breaking strength. It is even better, if in addition the reel has an easy handling, i.e. it is light enough, but stable, has relatively simple construction for easy disassembling for maintenance and assembling, and the spool is easily exchangeable without using a tool.

Presently available fly reels are able to satisfy the above requirements only to a more or less limited extend. Many attempts to improve the function and handling comfort of fly reels are known to exist from prior art publications including: U.S. Pat. Nos. 2,269,808; 3,478,977; 3,490,714; 3,697,012; 4,352,474; 4,544,114; 4,715,555, 4,728,054; 5,626,303; 5,921,492; 6,095,311; 6,193,182 and 6,513,743 B1.

Direct-drive reels, where the crank knob is mounted directly on the spool are usually provided with a drag setting knob, which in its best version is conveniently accessible from the crank knob's front side of the reel, as shown for example in U.S. Pat. No. 5,921,492. When using this kind of reels, a relatively light drag is preset by the drag knob. If additional drag is necessary for fighting the fish, the angler might try to re-adjust the drag knob which however, because of the fast rotating spool and crank knob is less appropriate than palming the reel spool. For bigger species this exercise requires the use of a glove on the line hand. When the fish surges away, the hand should be instantly removed in order to avoid a line break. A switching from this palming operation mode to a mode of winding line in requires that the palming hand becomes again winding hand, wherein if the fish surges again, the crank holding fingers have to instantly slip from the crank so as to avoid either an injury or a line brake, or both. The last one was mainly the reason for occasionally calling direct-drive reels "knuckle busters" and thus, for developing anti-reverse reels.

In an anti-reverse reel, the crank is attached to a separate handle which is coupled to the spool by the drag friction for winding in line, but remains stationary during a backward rotation of the spool against the preset drag force. Thus, the use of such reel requires, that after having striped line from the spool against a lightly set drag for preparing a cast, the drag knob has to be tightened to relatively high drag force sufficient to avoid that, when fighting a fish it stripes line from the spool while the angler winds in. In practice the re-tightening of the drag happens mostly on-purpose when fighting a fish, which is a tricky exercise considering the fact, that drag knobs or wheels are usually arranged behind the handle and close to the rotating front spool wall and thus, difficult to approach and operate. U.S. Pat. No. 4,352,474 describes an anti-reverse fly reel the drag force of which can be adjusted by means of an adjuster knob arranged behind the crank knob. Such an adjustment is useful for providing a pre-set drag. However, since it requires a hand move being different from that natural one for winding in line, it is difficult to use this drag system also for a dynamic drag adjustment under fish fighting conditions. The same drawback is typical for another known modification of such reel where the drag force can be dynamically altered by squeezing the crank knob. Another U.S. Pat. No. 6,513,743 B1 relates to an anti-reverse fly reel having a knurled drag adjustment knob on the back side thereof. Adjacent to the drag knob, there is provided a drag offset mechanism for altering the drag preset by the drag knob between a light drag and a heavy drag. Besides being complicated, this reel requires the angler to re-open and re-tighten—in this case the drag offset mechanism—every time he changes between the light drag position for paying out line from the spool and a heavy drag position for a ready-to-fight mode. Since both the drag knob and the offset mechanism are located on the backside of the reel, they are useful in the practice only as drag preset means, whereas a dynamically controllable drag change is difficult to perform.

Because of the above mentioned drawbacks, so called dual-mode reels have been known for more than sixty years, as for example from the U.S. Pat. No. 2,269,808. The reel described in this patent actually represents an anti-reverse reel, where a basic drag force can be preset by a propeller wheel arranged behind the handle. In parallel to the propeller wheel, there is provided an additional drag control device which when actuated by the handle in reel-in direction causes a tightening of the drag mechanism over the preset drag. This is accomplished by a screw connection between the handle and a drag pressing element, so that a winding rotation of the handle causes an infinite drag tightening until a direct-drive mode, i.e. a mode in which the handle is fixedly coupled to the spool for winding in line, is achieved. Therefore, the handle torque necessary for winding in a fighting fish causes a tremendous drag increase beyond the strength of the strongest line, and even more far away from the value actually necessary in order to frictionally couple the handle with the spool. Thus, if the fish bolts during winding in line while unavoidably causing a tension beyond the line's breaking strength, the angler's chances to avoid a line break are even less than with an ordinary direct-drive reel, where a quick slip of the fingers from the crank knob could be a remedy.

The dynamic drag control by the reel handle has been occasionally re-designed over the years, however without any principal change of its principle. In the U.S. Pat. No. 5,626, 303 there is disclosed substantially the same dynamic drag control providing an unlimited drag increase. The U.S. Pat. No. 6,095,311 describes a reel having a dynamic drag control using instead of a screw coupling between the handle and a drag pressing element relatively short and steep cam surfaces which require much smaller rotation angle of the handle in order to quickly switch from the anti-reverse into the direct-drive mode. Although this alleviates to some extent the problem of escaping from the direct drive mode in case of a sudden fish run on the one side, it makes a sensible dynamic drag control over a reasonable rotation angle of the handle difficult on the other side. Thus, fighting a fish with this reel requires either the well known palming of the spool or a parallel drag force setting by its drag wheel which—because being hidden behind the handle—is difficult to approach and operate. Last but not least, the reel requires the use of particular steering plates provided with a plurality of tiny accommodating cam channels having changing cross-sections with a plurality of tiny balls revolving in these channels.

SUMMARY OF THE INVENTION

The object of the present invention is to provide an improved fly fishing reel, spool, drag and ventilation system. A particular aim of the present inventors is to provide an anti-reverse fly reel of a simple assembly, lower weight, better ventilation, after all an enhanced operation ability allowing a simple by-instinct- and safety-of-line-control of drag and retrieve, and all this with a minimum number of parts.

The object of the invention is achieved by the combination of the features defined in each of the independent claims. Preferable embodiments of the invention are set forth in the sub-claims.

According to a first aspect of the invention a fly reel comprises a spool being substantially freely rotatable in reel-in direction and rotatable in reel-off direction against a friction force of a drag, a first drag control device which provides a frictional contact between a handle and a spool and which can be operated by the handle so as to alter the friction force within a control range having an upper limit, and a second drag control device for adjusting the control range. Such a fly reel is preferably constructed such that the upper limit of the drag control range is represented by the strength limits of customary lines, in particular their line tippets. Such strength limits are usually between 1 and 40 kp. With the reel according to the invention, when fighting a fish, depending on the tension on the line a rotation of the handle in reel-in direction causes a tightening of the drag and thus an increasing drag force until this force and the handle torque are enough to cause a switch into the direct-drive mode for reeling in line on the spool. However the handle can be rotated in reel-in direction while progressively increasing the drag force only up to a limit being preset by the second drag control device to be slightly lower than the tippet strength of the line, wherein a further rotation torque on the handle in this direction will not cause a further increase of the drag force but only an idling of the handle relative to the spool. Thus, even if there is a strong pull on the line during a forward, drag tightening rotation of the handle, or the handle is accidentally overturned, the drag force will not exceed the tippet strength of the line.

A preferable embodiment of the reel provides that the drag control devices are arranged directly on the reel shaft or on a common rotatable supporting element in a relation next to each other or with the spool arranged there between. In case of a common supporting element the first drag control device is preferably provided with a drag control member, which can be axially slipped on the supporting element and then, after a rotation thereof, be caught in the circumferential direction between a radially extending portion of the supporting element and the spool. By means of this bayonet coupling which also serves as a variable drag control device, the handle can be securely attached to the reel thereby locking the spool.

According to another preferable embodiment the spool and the first drag control device are arranged within an axially restricted space so that a handle rotation relative to the spool causes a variation of the axial expansion of the first drag control device within a limited stroke so as to increase or decrease a basic drag force preset by the second drag control device. Hence, this embodiment relates to any drag device arrangement where two drag control devices are arranged in series for adjusting the drag force acting on the spool, and where the first drag control device covers a certain drag force range while the second drag control device only shifts this range to higher or lower drag force values. Therefore, it is of secondary importance in which sequence the first drag control device, the spool, and the second drag control device are axially arranged one after the other. According to a preferred embodiment, the second drag control device is arranged on the side of the reel opposite to the handle side or the second drag control device is accommodated within a depression portion of the handle extending into the inner side of the spool.

The drag biasing device of the reel preferably has a progressive characteristic curve, which preferably consists of a relatively flat ascending portion and a relatively steep ascending portion. The flat ascending portion should preferably cover a biasing force causing a drag force in a range of not more than 0.5 to 0.7 kp and a stroke distance which preferably does not exceed the biasing stroke distance of the steep ascending portion. Thus, one can make sure that the maximum possible biasing force which can be achieved by a forward rotation of the handle falls always in the steep ascending portion of the drag biasing device. The drag biasing device preferably consists of a plurality of elastic members being arranged in parallel or in series to each other, and more preferably having different characteristic curves.

According to a further aspect of the invention, a fly reel is provided with a spool being substantially freely rotatable in reel-in direction and rotatable in reel-off direction against a friction force of a drag, a frictional engagement between the handle and the spool and a drag control device for adjusting the drag force of the frictional engagement, wherein the drag control device is accommodated substantially completely within a depression of said handle extending into the inner space of the spool. In a preferred embodiment of this reel, the drag control device is formed as a propeller or stern wheel preferably provided with four protrusions creating four finger engaging portions between them. Thus, the drag control device can be adjusted even by one finger, preferably by the thumb of the winding hand. It has been found that, for reliably engaging the drag wheel from the side by one or more fingers, three partitions cause a grip being inadequate for the fingers of a human hand, whereas five partitions create engaging portions being often too tight for the fingers.

Another aspect of the invention provides a fly reel having a support element being rotatable only in reel-in direction, a spool being rotatable on the support element and also being able to be urged against the support element, and a drag control device providing a frictional interconnection between the spool and a handle, wherein the drag control device comprises a drag control member which can be axially slipped on the support element to be then, by a subsequent rotation relative to the support element, caught in circumferential direction between the support element and the spool. In particular, the drag control element axially abuts against a radially extending portion of the support element so that, when rotated on the support element, it axially urges the spool for adjusting the drag force. The drag control element is preferably a wedge-shaped element the tip portion of which forms a circumferential abutment portion for catching the radially extending portion. The wedge-shaped element is preferably cut as a portion of a control sleeve, wherein the sleeve serves as a slide bearing rotatably supporting the handle on the support element.

Another aspect of the present invention relates to a spool for a fly reel, the spool comprising two annular walls connected to each other by a cylindrical arbor wall and circumferentially repeating circular perforations, wherein each perforation consists of an axially straight cutout of the arbor wall merging into a partial circular cutout of at least one of the annular walls, said circular cutout having a diameter being larger than the circumferential width of the axially straight cutout. Such an omega-like perforation design can optionally include further perforations in the annular walls and provides an optimum of inherent stability at a minimum of weight.

According to a preferred embodiment of the spool, the perforation penetrates both annular walls so that the spool arbor is formed by a plurality of bridges remaining between the adjacent straight cutouts and merging into portions of the annular walls remaining between adjacent circular cutouts. These bridges are preferably circumferentially interconnected by a ring- and/or disc-like portion arranged within the spool. Another preferred embodiment of the spool provides that the distance between the circular cutouts and the outer edge of the respective annular wall is substantially the same as the distance between adjacent circular cutouts.

The present invention is also related to a fly reel according to a further aspect, said reel comprising a frame, a handle and a spool, wherein a portion of the frame and/or a portion of the handle extends inside the spool to form an air turbine along with an inner portion of the spool. In a preferred embodiment using the spool described above, an air turbine is provided between at least one portion of the frame and/or the handle, said portion being provided with protrusions extending radially opposite and inclined to the straight cutouts of the arbor wall.

The above and further aspects of the present invention and their modifications will be described in more detail with reference to the following embodiments and the attached figures.

BRIEF DESCRIPTION OF THE DRAWINGS

FIG. 25 is a partial vertical cross-sectional view of a fly reel according to an eighth embodiment of the present invention;

FIG. 26 is a developed top view of the drag control device of the reel shown in FIG. 25;

FIG. 27 is a partial developed top view of the handle guard ring of the reel shown in FIG. 25;

FIG. 28 is a partial developed top view of the rear frame guard ring of the reel shown in FIG. 25;

DESCRIPTION OF PREFERRED EMBODIMENTS

1$^{st}$ Embodiment

Figure 1:
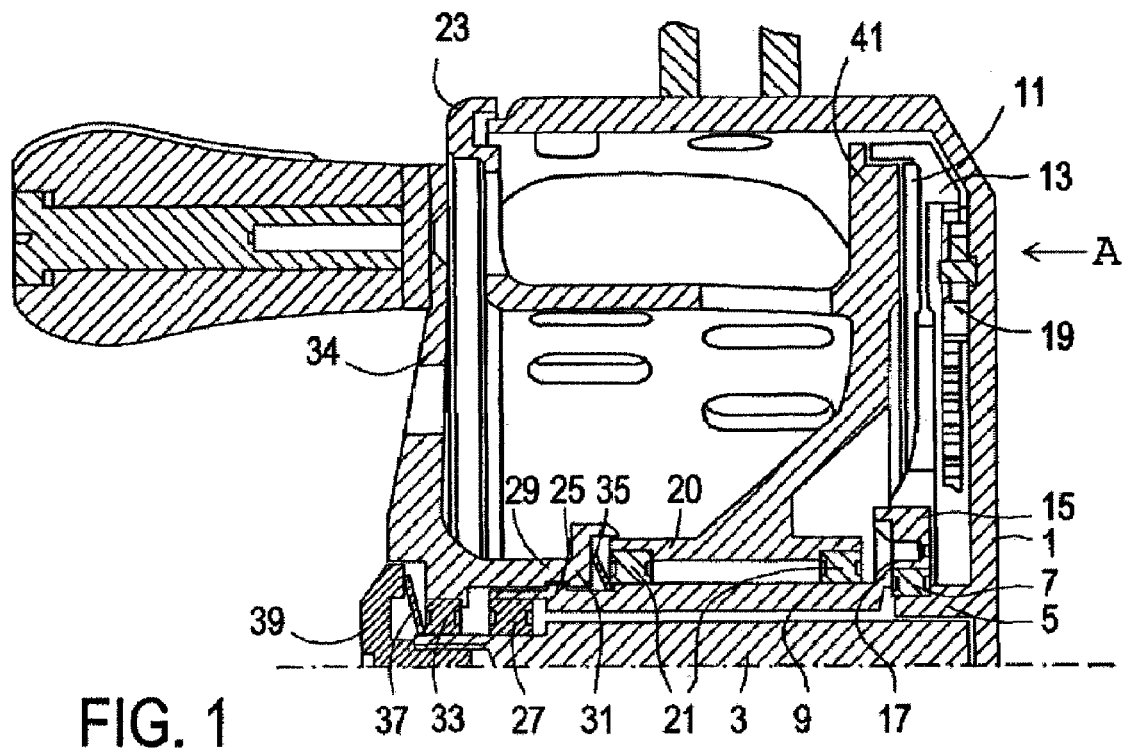
FIG. 1 is a partial vertical cross-sectional side view of fly reel according to a first embodiment of the present invention.

As shown in FIG. 1 a fly reel according to a first embodiment of the present invention has a frame 1 carrying a shaft 3 fixedly connected to the frame. For this purpose the shaft 3 is pressed into a collar portion 5 of the frame 1. On the outer circumference of the collar portion 5 there is mounted a roller bearing 7 supporting a carrying sleeve 9 provided with a drag ring 13 carrying a drag lining 11. The inner portion of the drag ring 13 is fixed by screws to a flange portion 17 of the carrying sleeve 9. Between the drag ring 13 and the frame 1 there is provided a free-running mechanism 19 which allows a free rotation of the drag ring 13 together with the carrying sleeve 9 in a clockwise direction—a shown in the direction of the arrow A in FIG. 1—but blocks a reverse rotation of the carrying sleeve in the opposite direction. Particularities of the free-running mechanism 19 can be derived from the U.S. Pat. No. 6,513,743 B1 which is incorporated herewith by reference for the purposes of an enabling disclosure of the present embodiment.

Figure 2:
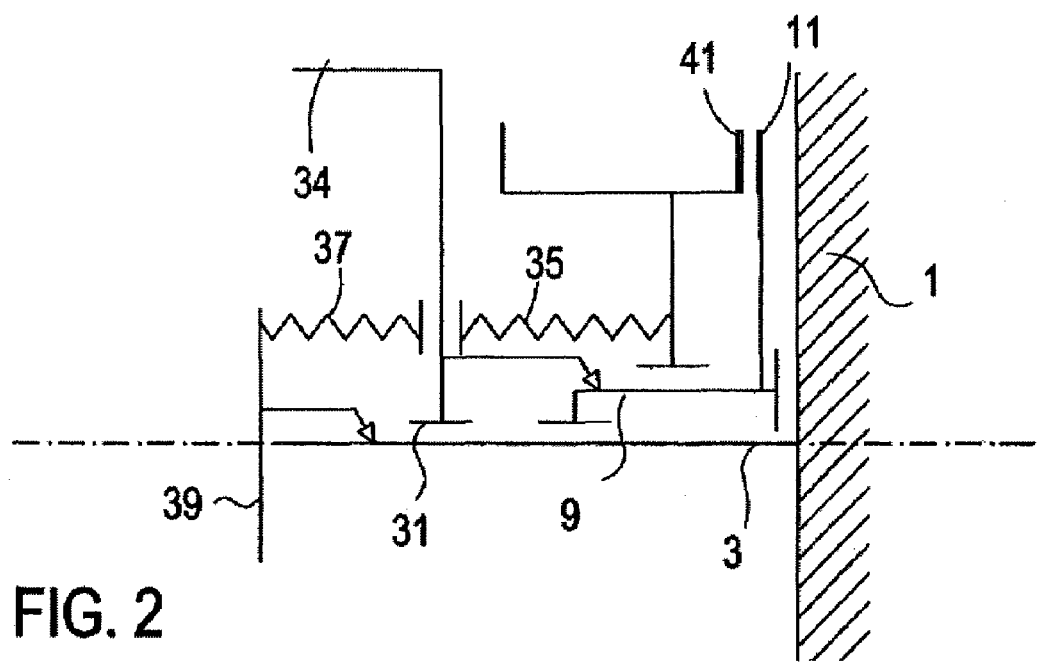
FIG. 2 is a kinematic model of the reel shown in FIG. 1.
Figure 5:
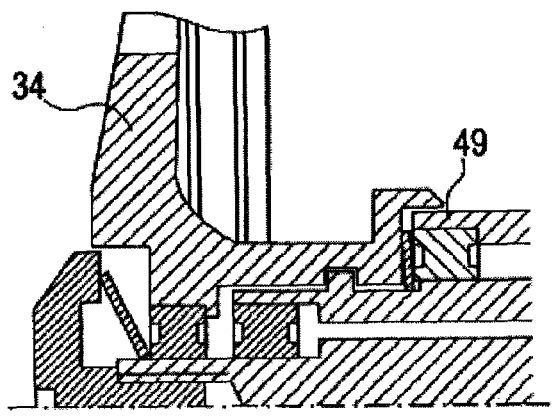
FIG. 5 is an enlarged partial vertical cross-sectional side view of the reel shown in FIG. 1 in an actuated state of the handle.
Figure 3:
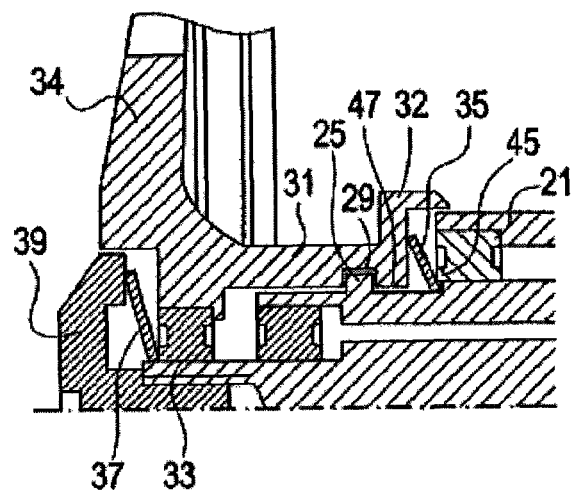
FIG. 3 is an enlarged partial vertical cross-sectional view of the reel shown in FIG. 1 in a non-actuated state of the handle.
Figure 6:
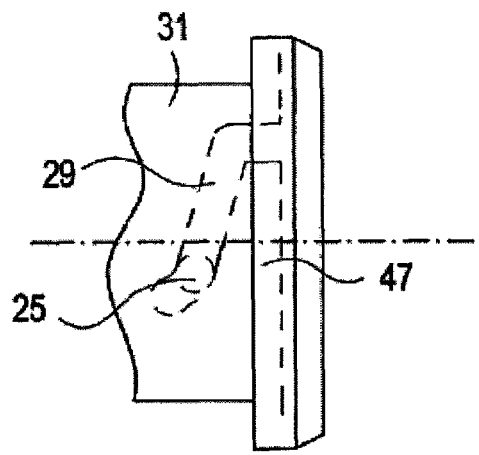
FIG. 6 is a top view of the control sleeve used in the first embodiment of the reel in a an actuated state of the handle.

On the outer side of the carrying sleeve 9 a spool sleeve 20 is rotatably supported by two axially slidable ball bearings 21. The spool sleeve 20 is integrally formed with a large arbour as a line storing bed of the spool 23. The carrying sleeve 9 is provided on its left end in FIG. 1 with a guiding pin 25, said end being supported on the shaft 3 by means of a further bearing 27. As particularly shown in FIG. 4, the guiding pin 25 is slidably accommodated within a channel-like cutout portion 29 on the inner circumference of a control sleeve 31. In the present embodiment the control sleeve is integrally formed together with a handle 34 which is rotatably and slidably arranged on the shaft 3 by means of a roller bearing 33. Further, the control sleeve is axially urged against the spool sleeve 20 by means of a first conical spring washer 35 on the one side, whereas the sleeve is axially urged via the bearing 33 against a cap 39 screwed into the shaft 3 by means of a second conical spring washer 37, on the other side. The kinematic model of the reel is shown in FIG. 2, while a detailed illustration of the drag control mechanism is shown in FIG. 3. In the following the assembling and the function of the reel according to the first embodiment will be described with reference to the FIGS. 1 to 6 while explaining further details of its construction.

Figure 4:
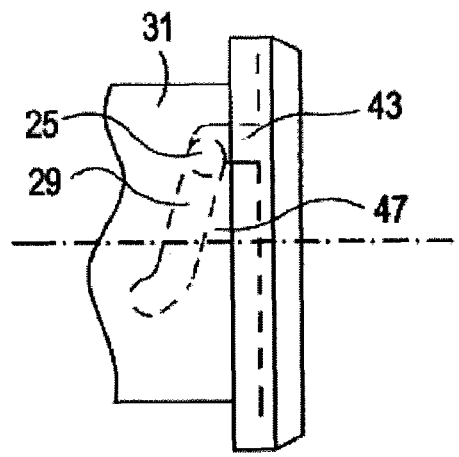
FIG. 4 is a top view of the control sleeve used in the first embodiment of the reel in a non-actuated state of the handle.
Figure 7:
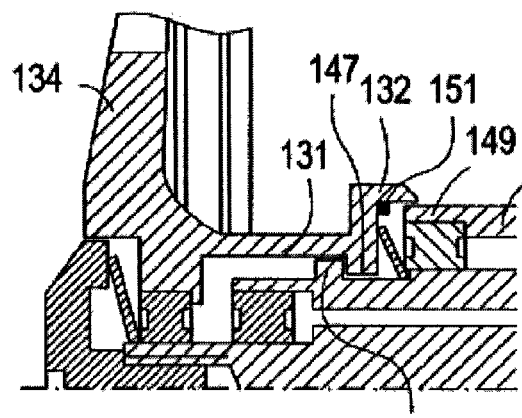
FIG. 7 is an enlarged partial vertical cross-sectional view of a reel according to a second embodiment in a non-actuated state of the handle.
Figure 9:
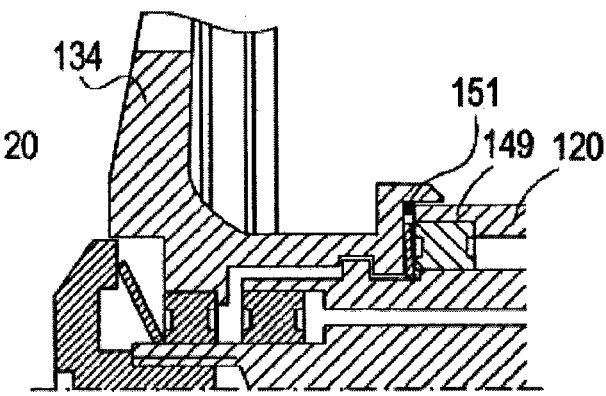
FIG. 9 is an enlarged partial vertical cross-sectional view of the reel according to the second embodiment in an actuated state of the handle.

When assembling the fly reel, the carrying sleeve 9 is first slipped on the shaft 3 and brought in abutment with the frame collar 5, and then the spool 23 is slipped on the carrying sleeve 9 until a ring-like drag portion 41 of the side wall of the spool is brought in abutment with the drag lining 11 of the drag ring 13. Subsequently, the control sleeve 31 carried by the handle 34 is axially slipped on the carrying sleeve 9 until the guiding pin 25 reaches the mouth of the drag control channel formed by the cutout portion 29 via an axial guiding channel 43 as shown in FIG. 4. Then, the sleeve 31 is rotated—when shown in the direction of the arrow A in FIG. 1—in a clockwise direction while axially pushing the first spring washer 35 so that the control sleeve 31 becomes axially locked on the carrying sleeve 9. This assembling step can be best seen on the FIGS. 3 to 6. For completing the reel assembling, by screwing the cap 39 into the front end of the shaft 3, the second conical spring washer 37 is pre-biased against the inner shell of the bearing 33 so that the reel is ready for use.

The operation of the reel during its proper use is as follows:

In the initial position shown in FIGS. 3 and 4, the forces exercised by the spring washers 35 and 37 are in balance. Because these forces are relatively low, the drag portion 41 of the spool 23 is urged against the drag lining 11 for establishing only a minimum basic drag force. The drag force is initially conducted via the first spring washer 35 to the inner shell of the ball bearing 21 being preferably an angular ball bearing, wherein this force is nevertheless high enough to avoid a slippage of the spool 23 relative to the drag lining 11 due to the water resistance when retrieving line from the water on the reel. The guiding pin 25 is located in this state in the mouth of the drag control channel 29. In this position, line can easily be paid out for preparing a casting, wherein the spool rotates counter-clockwise relative to the drag ring being stationary in this mode while obviating the minimum drag force. If the cast line is then to be retrieved against a higher tension exercised on the line, a turning of the handle in the clockwise direction initiates a turning of the control sleeve in this direction, and thus, it causes a soft further slip-in of the control wedge-shaped member 47 of the control sleeve between the guiding pin 25 and the inner shell of the bearing 21 via the first spring washer 35. As a result the drag force between the spool and the drag ring is increased while the axially biasing control wedge-shaped member 47 applies an increasing axial drag force on the inner shell of the bearing 21 and consequently also on the spool 23.

The circumferential stroke by which the control wedge-shaped member 47 of the control sleeve penetrates between the guiding pin 25 and the bearing 21 until it stops to then take the drag ring 13 and thereby the spool, this substantially depends on the progressiveness of the spring washer 35, the climb angle $\alpha$ of the control channel 29, and frictional coefficient of the intermediate friction pairs guiding pin/control channel and spool(drag portion 41)/drag lining 11. For example it can be calculated for this purpose by how much the coefficient of friction of the drag coupling of the pair spool (drag portion 41)/drag lining 11 should preferably exceed the sum of the coefficient of friction of the pair guiding pin/control channel and tg $\alpha$. Hence, the design of the frictional interconnection or coupling of the handle to the spool can be optimized in a commonly known way depending on the personal understanding of the particular reel manufacturer about operation comfort.

For releasing the drag force of the reel, the control sleeve 31 is brought back to its original position shown in FIG. 3 by turning back the handle 34. Assuming a minimum drag of the pair guiding pin/control channel and a maximum possible climb of the channel 29, an automatic retraction of the control sleeve can be achieved without the necessity of turning back the handle. The original axially balanced position of the handle results from the cooperation of the two spring washers as particularly shown in FIG. 2. This balanced position determines the drag force of the reel, which drag force can be increased or decreased by screwing the cap 39 in or out, respectively.

$2^{nd}$ Embodiment

The second embodiment shown in the FIGS. 7 to 10 is substantially identical to the first embodiment, which is the reason why corresponding elements of these embodiments are designated by corresponding reference signs. The second embodiment comprises different modifications of particular functional elements. For example in the region of the coupling portion 132 of the handle and in front of the shoulder 149 of the spool sleeve 120 there is provided a friction ring 151. Thus, when a certain drag pressure level of the first friction pair between the drag portion 41 of the spool and the drag lining 11 is exceeded, the frictional ring 151 is brought via the shoulder 149 of the spool sleeve 120 in frictional contact directly with the spool. Thus, a second direct frictional pair is established between the handle and the spool, so as to drastically increase the drag force. The second direct drag can be also used for frictional coupling of the handle to the spool and enables the angler to react immediately to any excessive pull on the line.

Instead of the control channel known from the first embodiment, in the second embodiment the control sleeve 131 is provided with an inner build-up 153 forming a wedge-shaped member 147 and also serving as a slide bearing for supporting the handle on the carrying sleeve. However, the inner build-up 153 can be also formed separately from the cylindrical portion of the control sleeve and then be fixedly attached thereto for example by welding, bonding, clamping or by a kind of a removable mounting. It is also possible to form the inner build-up 153 integrally with the coupling portion 132 as a unit which can be axially slipped on a purely cylindrical part of the control sleeve. Such a modification does not only simplify the manufacturing, but it allows also the use of different drag control sleeve units for desired different drag characteristics of the reel.

Figure 8:
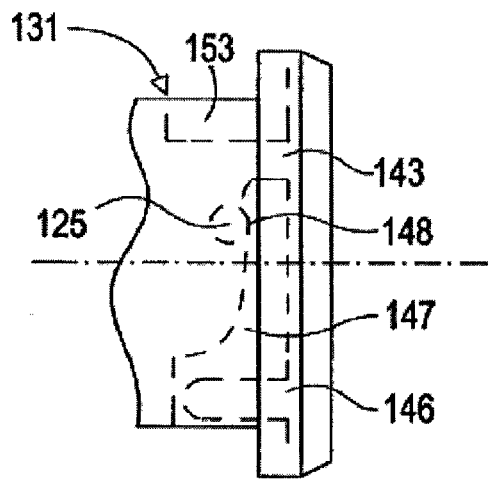
FIG. 8 is a top view of the control sleeve used in the second embodiment of the reel in a non-actuated state of the handle.
Figure 10:
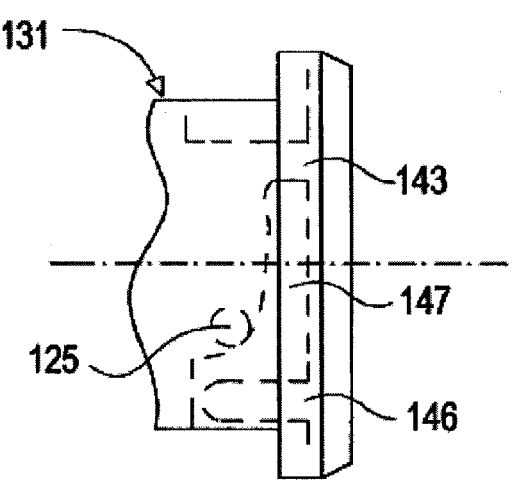
FIG. 10 is a top view of the control sleeve used in the second embodiment of the reel in an actuated state of the handle.

The control sleeve 146 shown in the FIGS. 8 and 10 also enables the conversion of the reel into a classic-style anti-reverse reel. For this purpose it is only necessary to engage the guiding pin 125 by the axially extending cutout channel 146 to. Another modification is the formation of a catching portion 148 at the control cam edge of the wedge-shaped member 147. By means of the catching portion 148 the locking of the control sleeve on the carrying sleeve can be made secure, so that after removal of the cap 139, the unit consisting of control sleeve, carrying sleeve and spool can be pulled out of the reel by the handle, for example in order to check the free-running mechanism 19.

3rd Embodiment

Figure 11:
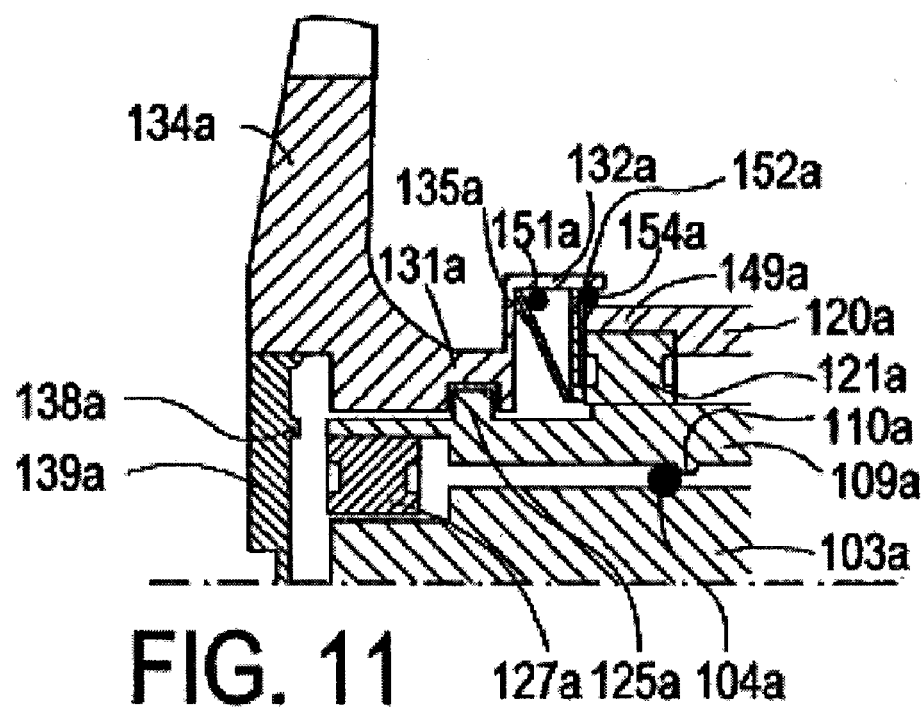
FIG. 11 is an enlarged partial vertical cross-sectional side view of a reel according to a third embodiment in a non-actuated state of the handle.
Figure 12:
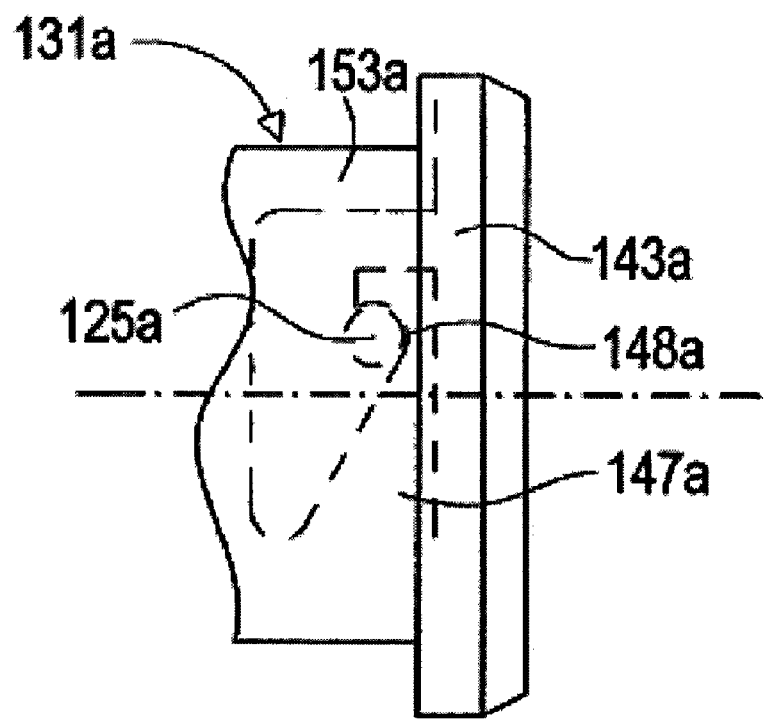
FIG. 12 is a top view of the control sleeve used in the third embodiment of the reel in a non-actuated state of the handle.

The third embodiment shown in FIGS. 11 and 12 is partially identical to the first and second embodiment, which is the reason why corresponding signs have been assigned to corresponding elements. The drag biasing device of this reel consists of a spring washer 135a and a silicon rubber ring 151a arranged in parallel, wherein both of these elastic elements are accommodated within the coupling portion 132a of the handle behind an axially slidable plain washer 152a which can be brought in pressure contact with the non-rotating inner shell of the ball bearing 121a. The washer 152a is held within the coupling portion 132a by means of another silicon rubber ring 154a which serves also for tightly sealing the circular gap between the coupling portion 132a and the spool sleeve 120a. Thus, the drag biasing device forms a part of a handle unit also including the handle 134a, the control sleeve 131a and the coupling portion 132a. This handle unit can be easily attached to or detached from the reel.

The reel is further distinguished from the one according to the first and second embodiment in that the handle unit is only supported on the carrying sleeve 109a and axially locked thereon by means of two diametrically opposite guiding pins 125a engaging the control sleeve. Further, the carrying sleeve 109a is held in place by means of a radial protrusion 110a which is caught axially behind a silicon rubber ring accommodated in a ring nut of the shaft 103a. Thereby the carrying sleeve is axially held in place so that the handle unit can be easily pulled out from the carrying sleeve for exchanging the spool and then be attached again and locked on the carrying sleeve. The mounting of the handle unit requires first that the handle is rotated until the control sleeve engages the guiding pins by the guiding channels 143a, whereinafter the handle is axially pressed against the spring washer 135a thereby causing the pins to axially pass by the catching portions 148a. Then the handle is rotated forwardly, thereby causing the catching portions 148a to slide circumferentially past the guiding pins 125a, so that after finally releasing the pressure on the handle the control sleeve is axially pushed back by the spring washer 135a, thus bringing the guiding pins in a circumferential engagement with the catching portions 148a.

During operation of the reel the drag force is initially increased by pressing the spring washer 135a. Depending on a further forward rotation of the control sleeve which increases the axial stroke thereof on the shaft, the rubber ring 151a becomes subsequently a further part of the elastic arrangement in addition to the spring washer, thus causing a further rapid increase of the drag force. The maximum axial stroke of the control sleeve 109a can however be limited by a setting of an adjustment cap 139a axially screwed into the handle 134a and comprising an abutment portion 138a being arranged axially opposite to the carrying sleeve 109a. Due to this construction, the screwed position of the cap determines the maximum axial stroke of the control sleeve on the carrying sleeve, thereby limiting the maximum drag force which can be achieved by a forward rotation of the handle before the handle becomes a rotating unit with the carrying sleeve and starts idling relative to the spool in situations where the pulling force on the line exceeds the thus adjusted maximum drag force. The adjustment cap 139a used in this example is of a particular advantage because it cannot be actuated unintentionally by the angler and can be provided on its outer edge with an index which can serve together with a corresponding scale on the opposite edge of the cap receiving hole of the handle for reading the maximum variable drag setting.

The reel according to the third embodiment is mainly characterized in that the drag control device comprising the control sleeve serves in the same time as a device for slidingly bearing and locking the handle on the reel. Thereby the reel construction and the spool change are significantly simplified without any need to sacrifice the full functionality of the reel targeted by the present invention. However among the variety of aspects of the present invention, the provision of a second drag control device the function of which is fulfilled here by the adjustment cap 139a remains nevertheless optional. For example reels dimensioned for lines of a class lower than class 6 do not need necessarily such a second drag control device because fighting a relatively light fish on such gear is mostly done by rim control. In this case the main advantage in the practice will result from the control sleeve system allowing a quick, simple and reliable change of spools in addition to an optional dynamic drag control by the handle.

4th Embodiment

Figure 13:
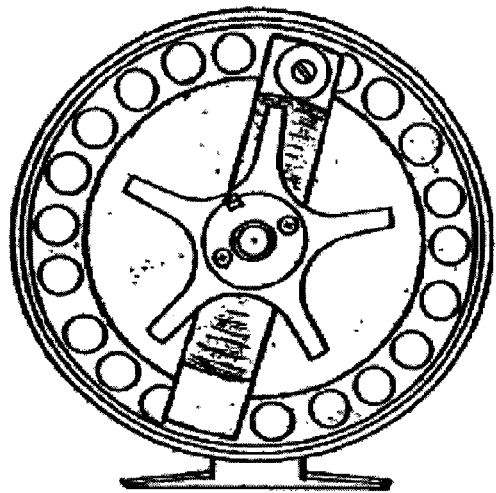
FIG. 13 is a front view of a fly reel according to a fourth embodiment of the present invention.
Figure 14:
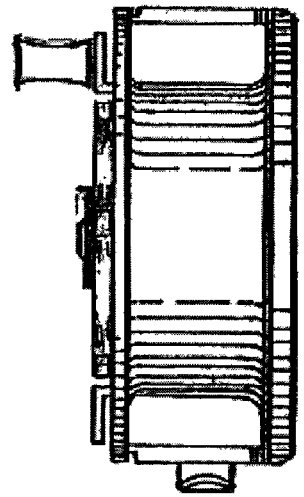
FIG. 14 is a side view of the reel shown in FIG. 13.
Figure 15:
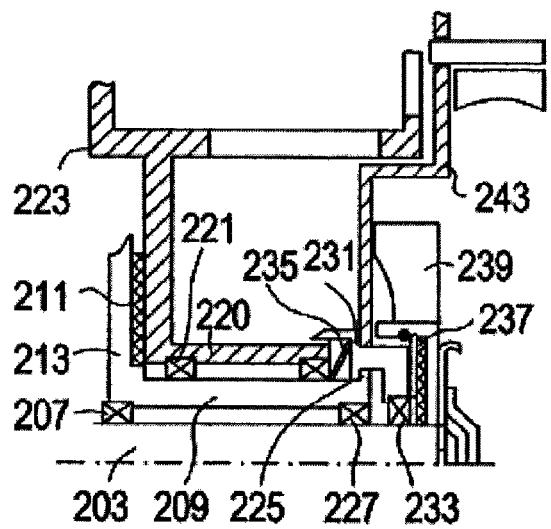
FIG. 15 is an enlarged partial vertical cross-sectional view of the reel according to the fourth embodiment.

The fourth embodiment shown in FIGS. 13 to 15 also relates to a large-arbor fly reel. This reel is substantially identical to the reel according to the first and second embodiments, which is the reason way corresponding elements are designated by corresponding reference signs. The fourth embodiment provides different modifications of particular functional elements. Although each of these modifications is important as such, they can be used as alternative modifications in the embodiments already shown in FIGS. 1 to 10.

As can be seen on FIG. 15, the fly reel according to the fourth embodiment has a shaft 203 being fixedly connected to a frame which is not particularly shown. A carrying sleeve 209 is rotatably supported on the shaft 203 by means of ball bearings 207, 227, This sleeve is integrally formed with a drag disk 213 being arranged opposite to a wall of the spool 223 provided with a friction lining, thereby forming the frictional pair of the reel drag. Between the drag disk 213 and the frame there is interposed a not particularly shown free-running mechanism which allows a freewheeling of the carrying sleeve 209 together with the drag disk 213 in one direction, but blocks a reverse rotation thereof. Particularities of this mechanism as well as further elements of the reel, except the variable drag control device to be described in the following, can be gathered from the U.S. Pat. No. 5,921,492, the disclosure of which is specifically incorporated by reference for the purposes of an enabling disclosure of this embodiment. A spool sleeve 220 is rotatably and axially slidably supported on the outer side of the carrying sleeve 209. The spool sleeve 220 is integrally formed together with a circumferential spool bed for accommodating a fishing line. The carrying sleeve 209 comprises on its right end in FIG. 15 a guiding pin 225, and is rotatably supported on the shaft 203 by means of the ball bearing 227. Although it is not particularly shown in FIG. 15, the guiding pin 225 is slidably received in a channel-like cutout on the inner side of the control sleeve 231 similar to that one of the previous embodiments. The control sleeve 231 is fixedly connected by means of a press fit to a handle 234 being formed of a sheet metal. This sleeve is rotatably and slidably supported on the shaft 203 by means of an angular ball bearing 233. Further, the control sleeve is on the one side urged axially against the spool 223 via a spring washer 235, and on the other side, the control sleeve is axially urged against a propeller knob 239 via an elastic pad 237, said knob being screwed on the shaft. By means of the propeller knob 239 a basic drag force of the reel can easily be adjusted. Hence, an important modification of the reel shown in this fourth embodiment consists in that the basic drag control device formed as a propeller knob 239 is substantially completely accommodated within a depression of the handle 234, wherein said depression extends axially into the inner side of the spool. Thus, the reel according to the invention comprises a drag control element which is easily accessible and operable while remaining well protected and compactly accommodated in the reel.

5<sup>th</sup> Embodiment

A fifth embodiment of the reel represents a modification of the reel and its drag and biasing mechanism already known from U.S. Pat. No. 6,095,311. This reel has a shaft 203*a* being fixedly supported on a frame. A carrying sleeve 209*a* is rotatably and axially slidably supported via ball bearings 227*a* on the shaft 203*a*. The carrying sleeve has a thin-walled, disc-like flange similar to the disc 213 shown in FIG. 15. This flange is arranged opposite to a spool wall provided with a friction lining, wherein the spool sleeve 220*a* is rotatably supported on the carrying sleeve 209*a* by means of a slide bearing 221*a*. Thus, the spool sleeve is axially pressed between the flange of the carrying sleeve 209*a* and an axially slidable plain washer 230 via a friction lining 211*a*, wherein the plain washer 230 remains secured against rotation on the shaft. For this purpose, the plain washer 230 is—as described in U.S. Pat. No. 6,095,311—provided with protrusions engaged in grooves machined in the carrying sleeve 209*a*. A not particularly shown roller clutch which freewheels and has the same function as the free-running mechanism described above is provided between the carrying sleeve 209*a* and the shaft 203*a*.

Figure 16:
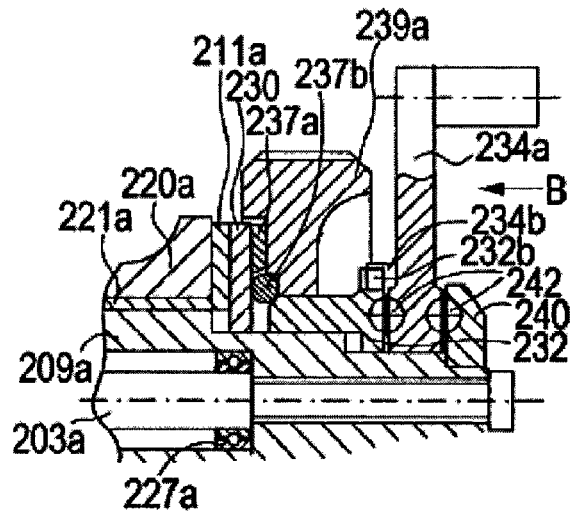
FIG. 16 is an enlarged partial vertical cross-sectional view of the reel according to a fifth embodiment of the present invention.

At the end of the carrying sleeve 209*a* there is provided a drag control device comprising a biasing mechanism for applying a variably adjustable drag force on the plain washer 230. This first drag control device comprises a handle 234*a* being arranged between a stationary ring 240 which is fastened on the end of the carrying sleeve 209*a*, and an axially slidable pressure element 232, wherein the handle can turn between the stationary ring 240 and the pressure element 232 on balls revolving in opposite inclined channels. Thus, a forward rotation of the handle for reeling a line on the spool presses axially away the pressure element 232, whereas a backward rotation of the handle—i.e. a rotation in clockwise direction when viewed in the direction of arrow B in FIG. 16—allows this element to be retracted back until the handle interlocks via the revolving balls with the adjacent ring 240 and element 232. Particularities of this mechanism are explained in more detail in the U.S. Pat. No. 6,095,311, the disclosure of which is specifically incorporated by reference for the purposes of an enabling disclosure of this embodiment.

The reel is particularly characterized in that the forward rotation of the handle is limited by an axially protruding stopper 234*b* of the handle 234*a* which hits a radially protruding stopper 232*b* of the pressure element 232. Thus, similar to the preceding embodiments, the handle 234*a* can be rotated relative to the pressure element 232 for achieving a dynamic drag control only within a limited angle range, thereby causing a correspondingly limited axial drag control stroke. This stroke is conducted by the pressure element 232 to the plain washer via a basic drag adjustment wheel 239*a* being screwed on the pressure element 232 and via two silicon rubber rings 237*a* and 237*b* arranged in parallel and having different thickness and hardness. Thus the drag adjustment wheel 239*a* serves as second drag control device being arranged in series with the first dynamic drag control device to be actuated by the handle 234*a*. The drag biasing device of the reel which comprises the elastic rings 237*a*, 237*b* has a progressive characteristic curve. This curve consists of a relatively flat portion caused by the first relatively thicker and softer outer ring 237*a*, and a subsequent relatively steep portion caused by the overlapping action of the first ring with the second relatively thinner and harder ring 237*b*.

When fighting a fish, the basic drag force of the reel, said force being set by the drag adjustment wheel 239*a* for easy striping line off the reel and a retrieve of loose line from the water on the spool, can be increased by turning the handle 234*a* in reeling direction until a maximum drag force—in practice being for example ⅔ of the leader strength of the line—is achieved at a position where the stoppers 234*b* and 232*b* come to abutment. Because of this engagement between the handle and the carrying sleeve, the application of additional torque on the handle will not cause a further drag increase, but either generate a retrieve of line, if the line tension is lower than the maximum drag, or an idling of the handle relative to the spool, if the line tension is higher than the maximum drag force. Thus, unlike the commonly known dual-mode reels, this reel keeps a permanent anti-reverse responsiveness, while allowing in the same time a maximum possible drag force variation with optional switching to direct-drive mode depending on the actual line tension. Because of the progressive curve characteristic of the drag biasing device, the maximum drag force of the reel can be adjusted within a broad range without significantly influencing the basic drag force which can be kept low enough for striping line off the reel and retrieving loose line from the water on the spool.

The reel according to the present embodiment can alternatively work with only one elastic ring. In this case, at least one of the stoppers 232*b* and 234*b* should be variably adjustable relative to the respective basic element, i.e. relative to the pressure element 232 or the handle 234*a*, respectively. Thus the urging axial stroke of the first drag control device can be properly adjusted as this is done in the third embodiment.

6<sup>th</sup> Embodiment

The fly reel according the sixth embodiment shown in FIGS. 17 to 20 is similar to the reel according to the fourth embodiment, except the parts related to the construction and arrangement of the free-running mechanism and the drag mechanism.

Figure 18:
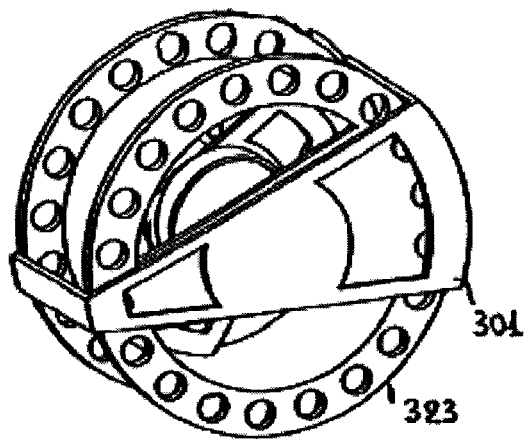
FIG. 18 is a three-dimensional rear view of the reel according to the sixth embodiment.
Figure 17:
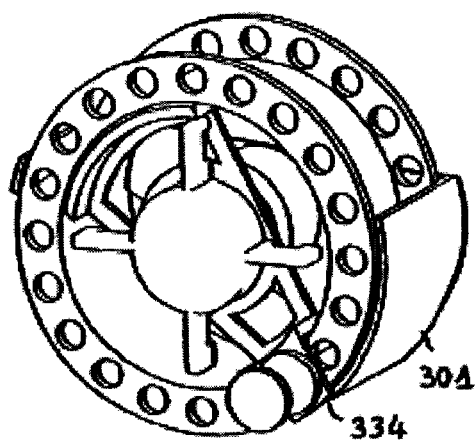
FIG. 17 is a three-dimensional view of a fly reel according to a sixth embodiment of the present invention.
Figure 19:
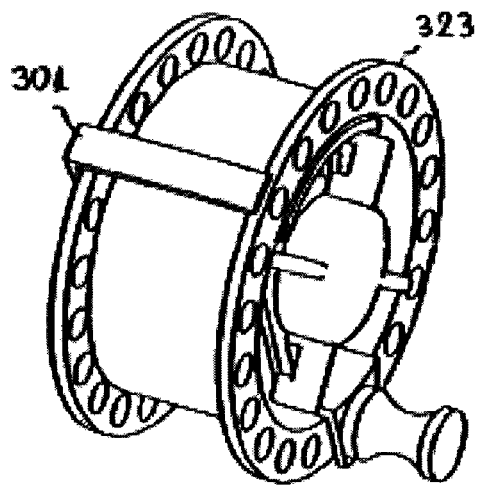
FIG. 19 is a three-dimensional side view of the reel according to the sixth embodiment.
Figure 20:
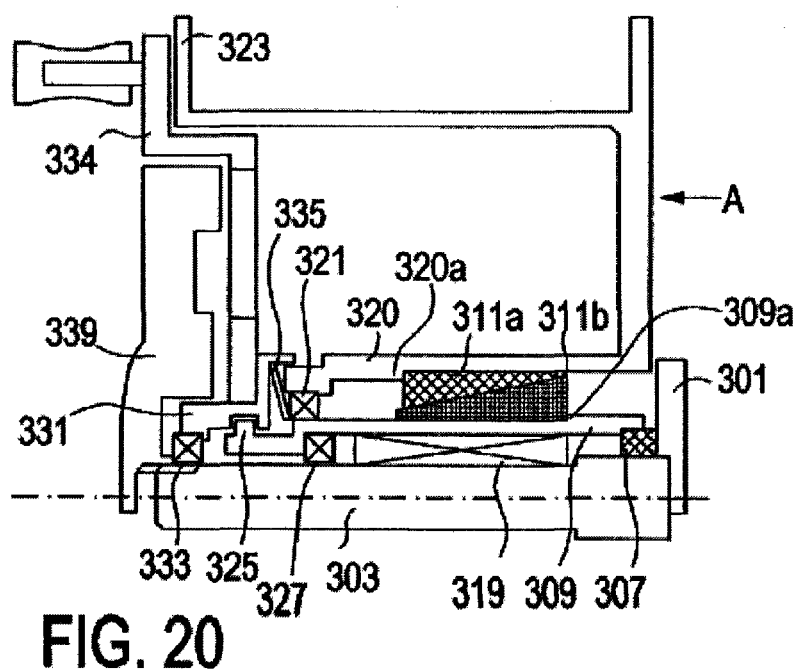
FIG. 20 is a partial vertical cross-sectional view of the reel according to the sixth embodiment.
Figure 21:
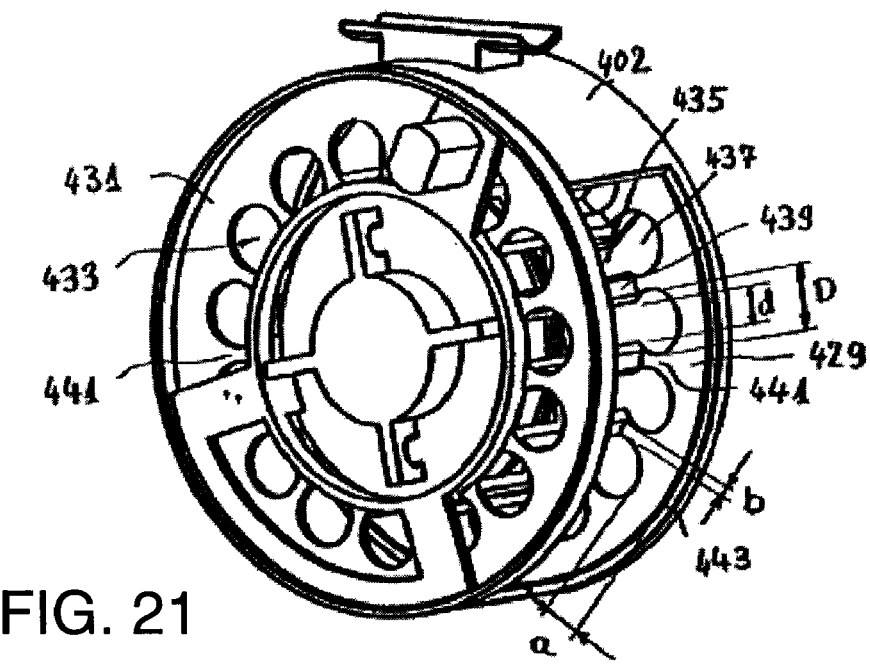
FIG. 21 is a three-dimensional view of a fly reel according to a seventh embodiment of the present invention.
Figure 22:
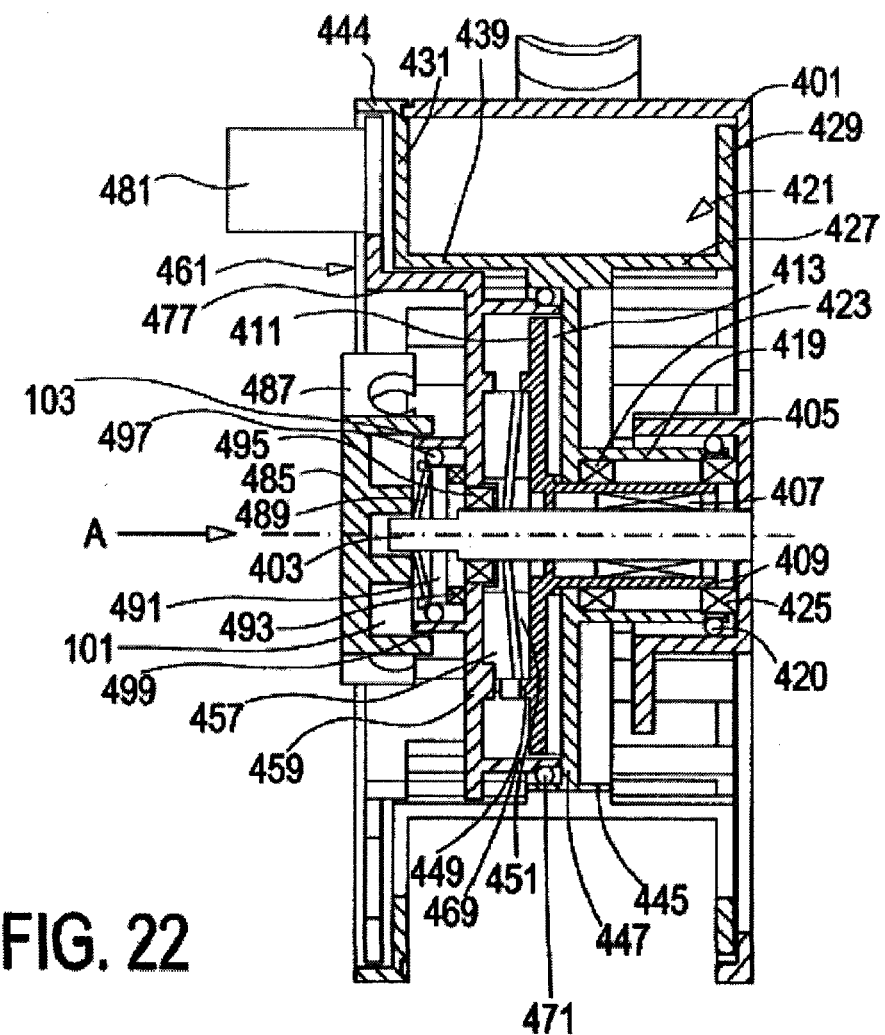
FIG. 22 is a vertical cross-sectional view of the reel according to the seventh embodiment.
Figure 23:
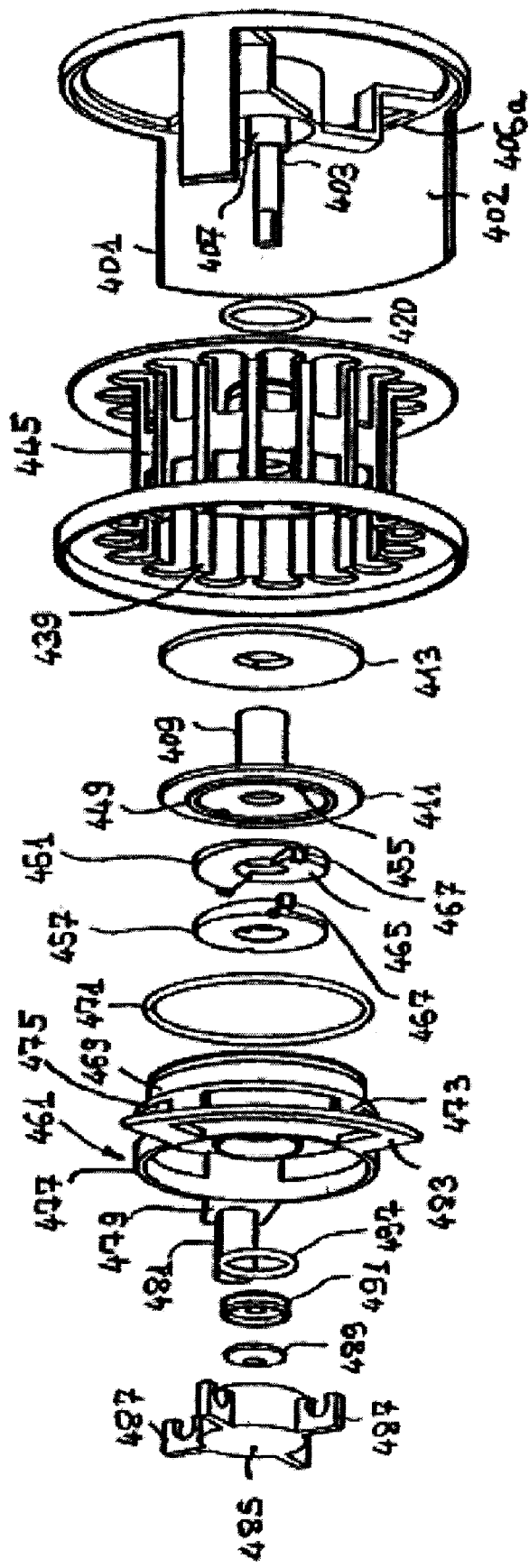
FIG. 23 is a three-dimensional exploded semi-front view of the reel according to the seventh embodiment.
Figure 24:
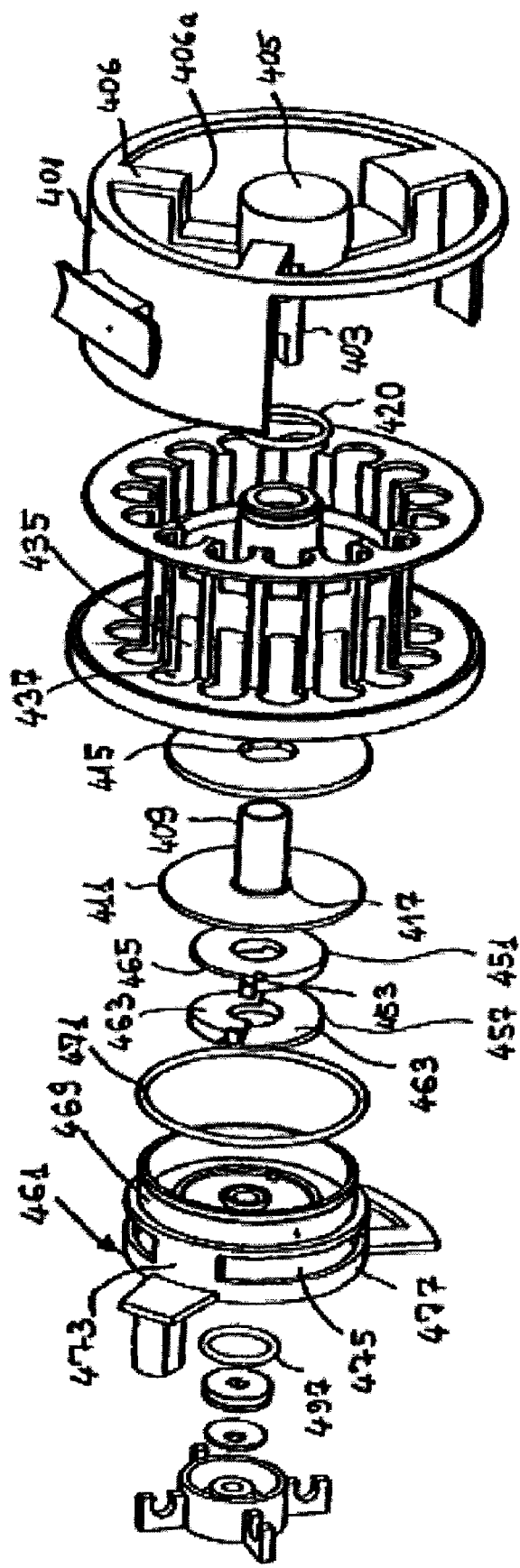
FIG. 24 is a three-dimensional exploded semi-rear view of the reel according to the seventh embodiment.

As particularly shown by FIG. 20, the reel has a shaft 303 being fixedly connected to a light frame 301 which is more particularly illustrated by FIGS. 17 to 19. A carrying sleeve 309 is rotatably supported on the shaft 303 by means of a ball bearing 327 and an axial slide bearing 307. Between the carrying sleeve 309 and a spool sleeve 320 there are arranged concentrically to each other two drag sleeves 311*a* and 311*b* forming by their opposite conical surfaces a frictional pair. These drag sleeves are correspondingly arranged in abutment with a shoulder 320*a* of the spool sleeve and a shoulder 309*a* of the carrying sleeve 309, so that the drag sleeves can be pressed against each other by an axial movement of the spool sleeve 320 relative to the carrying sleeve 309. Between the carrying sleeve 309 and the shaft 303 there is arranged a roller clutch 319 which freewheels in a clockwise direction—when shown in the direction of arrow A on FIG. 20—and blocks a backward rotation. The spool sleeve 320 is rotatably and axially slidably supported on the outer side of the carrying sleeve 309 by means of an angular ball bearing 321 and the drag sleeve 311*a* as a combined radial and axial slide bearing. In the same way as in the previous embodiments, the spool sleeve 320 is integrally formed with a large arbor spool 323 for reeling fly line thereon.

The carrying sleeve 309 is provided on its left end in FIG. 20 with a guiding pin 325. Although not particularly shown in FIG. 20, the guiding pin 325 is slidably received in a channel-like cutout on the inner side of a control sleeve 331 of the kind shown in FIGS. 4 and 6. Further, the control sleeve is also provided with an axially extending channel as shown in FIGS. 8 and 10, said channel being able to guide therein axially the guiding pin 325. The control sleeve 331 is fixedly connected by means of a press fit to a handle 334 being formed of a sheet metal, and it is rotatably and slidably supported on the shaft 303 by means of an angular ball bearing 333. Further, the control sleeve is on the one side urged axially against the spool 323 via a spring washer 335, and on the other side, the control sleeve is axially urged against a propeller cap 339 serving as a drag knob being screwed on the shaft. By means of the propeller cap 339 a basic drag force of the reel can easily be adjusted.

As already mentioned with regard to the fourth embodiment, a substantial characteristic of the reel resides in that the basic drag control device formed as a propeller cap 339 is substantially completely accommodated within a depression of the handle 334, said depression extending axially into the inner side of the spool. Thus, the reel according to the invention comprises a drag control element which is easily accessible and operable while remaining well protected and compactly accommodated in the reel.

7$^{th}$ Embodiment

The reel of the seventh embodiment shown in FIGS. 21 to 24 has a frame or reel body 401 carrying a shaft 403 fixedly connected therewith. For this purpose, the shaft 403 is press fitted into a hub 405 of the frame 401. The frame further comprises a mounting member 402 being connected by means of an integral ring portion 404 and three supports 406 to the hub 405. The supports are double-buckled so that each of them comprises an axially extending portion 406a.

On the shaft 403, a carrying sleeve 409 is rotatably and axially slidably supported by means of a roller clutch 407. Because of this roller clutch, a rotation of the carrying sleeve 409 in a counter-clockwise direction—when viewed in direction of the arrow A in FIG. 22—is possible, whereas a backward rotation in clockwise direction remains blocked. The carrying sleeve has a radially extending disc-like pressing portion 411 being provided with a disc-like friction lining 413 attached in a torque-proof manner thereon. For this purpose, the friction lining 413 is fitted by means of an oblong hole 415 on a correspondingly formed double-sidedly flattened torus 417 of the carrying sleeve. The friction lining is made of a Teflon compound material. On the carrying sleeve 409, a spool sleeve 419 of a spool 421 carrying fly line is supported radially by means of a ball bearing 423, and by means of an angular ball bearing 425 also axially against the frame 401. The portion of the spool 419 sleeve protruding into the frame hub 405 is provided with a silicon rubber seal ring 420 in order to avoid the intrusion of solid particles and fluids into the reel interior.

Coaxially to the mounting sleeve 419 of the spool there extends a cylindrical arbor wall 427 integrally formed with two radially extending ring-like walls 429 and 431 which define there between a fly line accommodating space. As it can be particularly derived from FIGS. 21, 23 and 24, the walls 429, 431 are provided with circumferentially repeating circular perforations 433. Each perforation 433 consists of an axially straight cutout 435 of the arbor wall 427, said cutout 435 merging into two adjacent partially circular cutouts 437 of the annular walls, wherein the diameter D of the circular cutouts is larger than the circumferential width d of the axially straight cutout 435. The repeating perforation 433 is carried out as a straight go-through perforation, so that the arbor wall 427 actually consists of a plurality of straight bridges 439 remaining between the axially straight cutouts 435, said bridges 439 merging into column-like portions 441 of the annular walls remaining between adjacent circular cutouts 437.

Although in the present embodiment, the distance a between the circular cutouts 437 and the outer rim 443 of the spool is preferably higher than the narrowest width b remaining between adjacent circular cutouts 437, it could be preferable to set this dimensions equal to each other in order to provide a maximum form stiffness of the spool at a possibly lowest weight. Also the ratio of the diameter D of the circular cutouts and the circumferential width d of the axially straight cutouts appears to be important, wherein this ratio is preferably between 2 and 3. As shown in the figures, the outer rim 444 of the spool is axially offset.

The bridges 439 of the spool arbor are connected to each other not only via the walls of the spool, but additionally also via a ring-like portion 445 extending inside the spool. In the present embodiment, the ring-like portion 445 is arranged approximately in the middle inside the bridges in order to provide an optimum stability of the spool and a radially protected space for the reel drag to be described in the following. The ring-like portion 445 is connected to the spool sleeve 419 via a disc portion 447 against which the friction lining 413 is urged by means of the disc-like pressing portion 411. The surface of the disc portion 447 which faces the friction lining forms thereby the friction pair of the reel drag.

On the side of the disc-like pressing portion 411 opposite to the side facing the friction lining 413, a first control disc 451 is fitted in a collar 449 in a torsion-poof way, wherein two diametrically opposite depressions 453 on the backside of the control disc engage with two correspondingly formed protrusions 455 inside the collar 449. A second control disc 457 is fitted in a disc-like pressing portion 459 of a handle 461 in the same torsion-poof way, wherein the control disc 457 has a front side which cooperates with a front side of the first control disc 451. These front sides are formed in a mirror-inverted way, wherein each of them consists of two cam surfaces having the same climb angle in circumferential direction. Thus, a rotation of the second control disc 457 relative to the first control disc 451 in a counter-clockwise direction—when viewed in the direction of the arrow A in FIG. 22—pushes axially away the control discs, whereas an opposite backward rotation causes a contraction of that biasing device consisting of said two control discs. The control discs are formed of a plastic material having a particularly low friction coefficient like Teflon. Each control disc 457, 451 further comprises on its circumference two diametrically opposite protrusions 467 formed at the step-like transitions between the cam surfaces, said protrusions cooperating with respective protrusions on the opposite control disc in order to avoid a relative rotation of the two discs by more than ca. 160°.

The Handle 461 has cylindrical portion 469 protruding into the inner side of the ring-like portion 445 of the spool so as to form a closed space for accommodating the reel drag and the drag biasing device. For this purpose, a seal ring 471 is interposed within a nut machined in the edge of the cylindrical portion 469 so as to seal the gap remaining between the cylindrical portion 469 and the ring-like portion 445 of the spool without excessively hindering a rotation of these elements relative to each other. The handle 461 has on the other side of the disc-like pressing portion 459 an outer cylindrical portion 473 being provided with cutouts 475 as particularly shown in the FIGS. 23 and 24. The edge of the cylindrical portion 473 being arranged radially within the front wall 431 of the spool forms a closed protection ring 477, wherein radially outside of this ring, there extend a hand crank portion 479 comprising a crank knob 481 as well as a substantially diametrically opposite balancing portion 483.

Radially within the axially offset outer rim 444 of the spool behind the protection ring 477, there is provided a drag knob 485 being screwed on the end of the shaft 403. The drag knob 485 is formed as propeller knob comprising four vanes 487 in order to provide a grip being adequate to a human hand. The drag knob 485 axially urges via a spring washer 489 a stiff washer-like pressing member 491 being axially slidable but torque-resistant on the shaft, said member conducting the urging force further to the disc-like pressing portion 459 of the handle 461 via a thrust bearing 493. Because the pressing portion 459 is arranged on the shaft 403 via an axially slidable ball bearing 495, this portion can further conduct the urging force applied by the drag knob to the friction pair of the reel drag via the drag control device consisting of the two control discs 451, 457, and via the disc-like pressing portion 411. The washer-like pressing member 491 is provided circumferentially with a nut for accommodating a seal ring 497 for sealing a gap remaining between the member 491 and collar portion 499 of the handle 461 extending toward the drag knob, without excessively hindering the rotation of the handle relative to the stationary member 491.

The reel according to the embodiment described above is operated as follows: As a first step, the handle 461 is rotated, while holding the spool, in reel-in direction, i.e. in a counter-clockwise direction—when viewed in direction of the arrow A in FIG. 22. As a result of this rotation, the control disc 457 being driven by the handle glides relative to the other control disc 451 which does not rotate because of its frictional coupling with the spool via the friction lining 413. This rotation is continued until the projections 467 of the control discs abut to each other. As from the turning angle at this position, a further rotation of the control disc 457 causes a simultaneous driving of the control disc 451 and thereby also a rotation of the carrying sleeve 411 along with the friction lining 413, wherein the lining starts sliding on the disc portion 447 of the sleeve with a constant friction force. In this position the maximum allowable drag force is adjusted by rotation of the drag knob 485 such as to be set appropriately below the strength of the line leader or tippet knotted between the line and the hook. Thereafter, the handle is rotated in the clockwise direction while minimizing the friction force. This backward rotation can be continued until the step portions of the cam surfaces engage, whereby the minimum drag friction force is achieved. This engagement can be easily sensed, because the control disc 451, which is "hooked" by the driving control disc 457, is in torque-proof engagement with the carrying sleeve which itself is blocked for backward rotation by the roller clutch 407. In this position a line can be easily paid out from the spool in order to prepare a new cast. However, the drag force exercised in this position by the drag knob only, is high enough for retrieving line from the water without causing a spool idling because of the water resistance. In case the cast line should be retrieved on the spool against a fighting tension on the line, a counter-clockwise rotation of the handle leads automatically to an increased drag according to the principle described above. This drag can be also decreased to a desired level by backward rotation of the handle, if this fits the fighting strategy. Hence, the line leader or tippet of the line remains always safe, because an overturn of the handle cannot cause an increase of the drag force over the upper drag limit set by the drag knob.

The reel according to the embodiment described above offers also a significant operation comfort by the drag knob formed as four-vane propeller knob being arranged in a tangle-free space protected by the handle and the spool rim on the same side as the crank knob. Due to the circumstance, that the propeller knob is compactly arranged in a space which protrudes from the front wall of the spool, but nevertheless remains radially covered by the axially offset spool rim 444, a maximum possible approach at a simultaneous protection also for the angler's hand is achieved. The axially offset rim 444 of the front wall of the spool does not serve only a tangle protection of the drag knob from the line, but also as an additional rim drag control when palmed by the operator's hand.

The fly reel further provides a good protection of the drag and bearing mechanism within the reel. Firstly, the arrangement of the drag mechanism in the middle of the reel provides a reliable protection against a mechanical stress. Secondly, the kind of arrangement and location of the seals provides in cooperation with a so-called buffer chamber 101 within the drag knob an efficient protection against the intrusion of water to the control and drag mechanism caused by a rapid temperature change. Such a temperature change occurs mostly in cases, where the relatively hot reel is dropped by accident in relatively cold water so that, despite of usual sealing measures at a reel, water is sucked by the air shrinking in the reel space accommodating functional elements. Considering this circumstance, the reel according to the invention is purposively provided with a "suction path" leading away from the functional elements along the shaft at the bearing 495, the pressing washer 491, and the spring washer 489, then through the buffer chamber 101 and finally out through a gap 103 between the cylindrical body of the drag knob 485 and the collar 499 of the handle 461. Because of this arrangement, the water is not sucked through the seals 420, 471 or 497 directly into the inner space of the reel, but it is guided through the gap 103 serving as throttle means into the buffer chamber 101. Hence the pressure difference drops rapidly along the aforementioned suction path toward the reel inner space, and only a minor quantity of wetness, if any, reaches the bearing 495.

The seventh embodiment described above can be modified in many different obvious ways for the skilled reader, without departing from the invention. The particular modifications, described in the following in connection with the eight embodiment, are limited to an emphasis of the main differences to the seventh embodiment without a detailed repetition of commonly used features and elements.

$8^{th}$ Embodiment

The reel according to the eight embodiment will be explained in following with reference to the FIGS. 25 to 28. The concept of this reel aims at a maximum functionality by a minimum number of parts.

As shown in FIG. 25, the spool 501 of the reel is substantially identical to the spool 421 of the seventh embodiment. However, the spool 501 has a disc-like pressing portion 502 only, which by means of ball bearing 503 rotatably supports the spool on the carrying sleeve 504. The carrying sleeve 504 is rotatably supported on a shaft 506 by means of a free-running sleeve 505. As it is also the case with the previous embodiment, the shaft 506 is press fit into the hub 507 of a frame which is not particularly shown here. The handle 508 is provided in the middle portion thereof with two integrally formed cylinders 509 and 510. In the inner cylinder 510 there is fixedly accommodated a control ring 511 made of hard metal, the developed view of which is shown in FIG. 26. The inner cylinder 510 is rotatably supported on the shaft 506 by overlapping a control sleeve 512 and the carrying sleeve 504 which supports the control sleeve 512. The control sleeve 512 forms together with a first pressing disc 513 and the carrying sleeve 504 a torque-proof unit, but remains together with the pressing disc 513 axially slidable on the carrying sleeve. By means of the outer cylinder 509, the handle is rotatably supported on the shaft 506 via an angular ball bearing 514. In addition, the handle is rotatably supported on the shaft 506 via the cylinder 509 and an angular ball bearing 514. The handle is urged to the right side in FIG. 25 by the drag knob 515, a spring washer 516 and an axially slidable solid washer, which however remains torque-proof on the shaft. This preset urging force exercised on the handle is conducted to the first pressing disc 513 which further bears via a first friction lining 518, the middle disc-like pressing portion 502 of the spool and a second friction lining 519, against the pressing disc 504a of the carrying sleeve 504 being itself axially supported on the frame 507 via a second angular ball bearing 520.

Similarly to the seventh embodiment, the handle is provided with a closed handle protecting ring 577, the unwrapped top view of which is shown in FIG. 27. As can be seen on this figure, on the outer circumference of this protecting ring there are machined vane-like ridges 541 which are slightly tilted with regard to the opposite bridges 539 of the spool arbor. Thus, a relative rotation between the spool and the handle causes an operation of these ridges together with the bridges 539 as an air turbine producing a ventilation flow between and along the spool bridges 539. In use, this ventilation flow hits also the line backing wound on the bridges and goes axially through the holes formed due to the axial cutouts of the spool arbor radially between the backing and the ring-like portion 545 of the spool. Such a complete ventilation does not only provide a fast drying of the line backing, but also ensures an efficient carrying-off of drag friction heat conducted from the disc-like pressing portion 502 to the spool bridges via the ring-like portion 545 holding said bridges together. A similar second air turbine is constructed on the backside of the reel, for which purpose the axially extending portions 406a of the three frame supports 406 are circumferentially extended to a whole protection ring 506a of the same kind as the handle protection ring 577. The outer circumference of this protecting ring is also provided with vane-like ridges 542 which are slightly tilted with regard to the opposite bridges 539 of the spool arbor so as to produce an air flow in a direction opposite to the air flow of the first turbine. Hence, each of these air flows splits at the ring-like portion 545 into a first partial flow along the arbor bridges and a second flow radially along the outer surfaces of the first and second pressing discs 513, 504a, respectively.

When the reel is operated with no significant tension applied on the line, a handle rotation causes a rotation of all reel elements being rotatably arranged between the two angular ball bearings 514 and 520 on the shaft 506 as a unit. If a tension force is applied on the line when fighting a fish, the carrying sleeve and the pressing discs 513 and 504a become stationary because of the free-running sleeve 505, so that the disc-like pressing portion 502 of the spool rotates back against the friction drag force produced by the friction linings 518 and 519. The further operation modes of this reel are the same as the operation modes of the reel according to the seventh embodiment.

Further embodiments of the reel according to the invention will be explained in the following with reference to different modifications of particular reel elements and/or functional groups.

Modifications Concerning the Drag Control Devices:

According to several embodiments of the invention, the handle driven dynamic drag control device (in the following referred to as DDC-device) consists of an axially expandable unit having a certain limited axial stroke. In this case, the drag control range covered by the dynamic drag control device is shifted by a further stationary drag control device (in the following referred to as SDC-device) along the characteristic curve of the drag biasing device, wherein the lower limit of this range is determined by the basic drag force preset by the SDC-device. However, following the example of the third embodiment, it is also possible to adjust the stroke of the DDC-device itself by means of the SDC-device, thereby keeping the lower drag limit constant and varying only the upper drag limit of the DDC range.

The cooperating control elements of the drag control devices can establish a sliding surface and/or a line pressure contact, or even a line rolling contact. In the case of a sliding line pressure contact as used in the embodiments one to six and eight, it is necessary to use materials having a higher hardness and wear resistance. The cooperating control elements can preferably consist of a least two, more preferably three control pair portions. For example, the control discs of the seventh embodiment could comprise three instead of only two cam surfaces.

Figure 29:
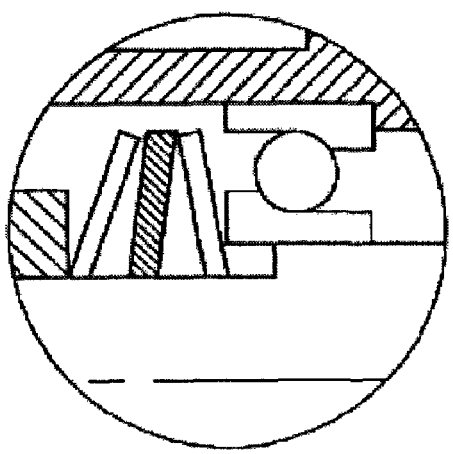
FIG. 29 is an enlarged partial cross-sectional view of the extract "A" in FIG. 25 showing an embodiment of the drag biasing device of the fly reel according to the invention in a non-actuated state.
Figure 30:
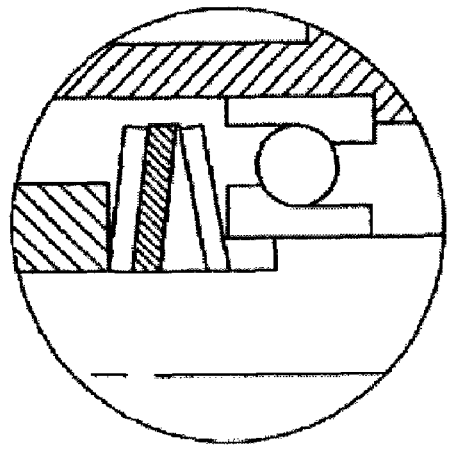
FIG. 30 is an enlarged partial cross-sectional view of the extract "A" in FIG. 25 showing an embodiment of the drag biasing device of the fly reel according to the invention in a semi-actuated state.
Figure 31:
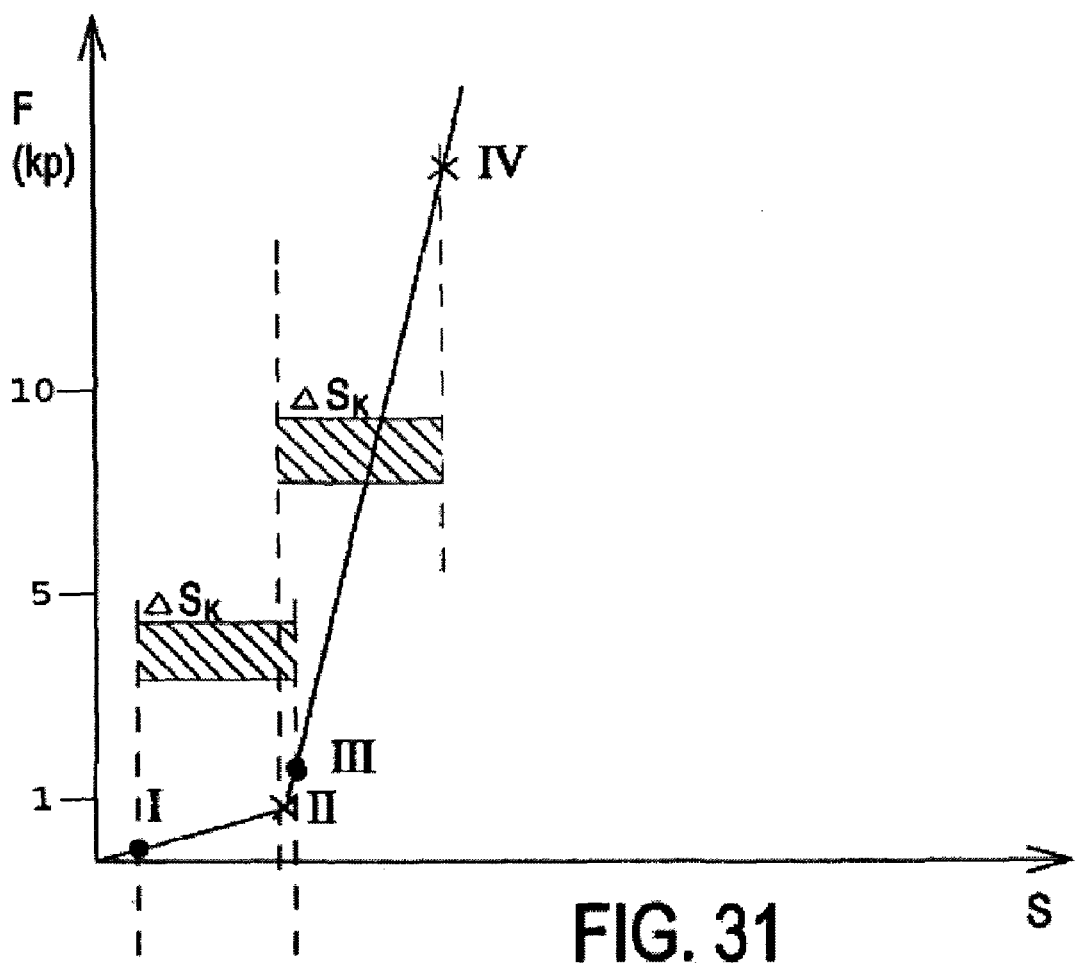
FIG. 31 is a diagram illustrating the characteristic curve of the drag biasing device shown in FIGS. 29 and 30.

Modifications Concerning the Drag Biasing Device:

The drag biasing device can comprise one or more elastic elements. FIG. 29 shows a modification of the drag biasing device used in the eighth embodiment. This device comprises a spring package of two spring washers 616a, 616b arranged in series, wherein the first spring washer 616a is relatively soft with a relatively flatly ascending characteristic curve, whereas the second spring washer 616b is relatively hard with a relatively steeply ascending characteristic curve. Between these springs, there is arranged a stable intermediate support washer 616c. When this spring package is compressed as shown in FIG. 30, the soft spring washer 616a is deformed until it abuts completely to the support washer 616c. This deformation phase is illustrated in FIG. 31 by the initial flat part of the characteristic curve. During a further compression of the spring package, the hard spring washer 616b contributes for a rapid increase of the drag force as shown by the steep curve part in FIG. 31. Such a drag biasing device enables the following function of the reel according to the invention: The flat part of the curve comprises possible preset values of the basic drag force adjusted for example by a drag knob. This part of the curve covers an urging distance which is shorter than the axial stroke $\Delta$ Sk of the DDC-device so that the maximum dynamically available drag value lies always on the steep curve portion. This is illustrated by the lowest possible dynamic drag range extending in FIG. 31 between the points I and III. This range can be shifted up by tightening the drag knob 515 to extend between the points II and IV in FIG. 31. In doing so, the basic drag force is only moderately increased between the points I and II, whereas the maximum available drag force can be adjusted within a broad range between the points III and IV. Thus, even at adjustments where the reel can produce a maximum drag force of about 15 kp as shown in FIG. 31, the basic drag force achievable by rotating the handle back in its "open" position would not exceed ca. 0.50 to 0.70 kp, thus still enabling the angler to easy pay-out line from the reel. Further, since the setting of maximum available drag force is co-related to the setting of the basic drag force, the angler will be able to indirectly assess the maximum available drag force of the reel by sensing the line pay-out resistance.

Modifications Concerning the Drag Knob and the Handle and their Arrangement:

According to the seventh embodiment, the drag knob is axially arranged substantially beyond the spool wall 431, but still behind the offset outer rim 444 of the spool. This preferred position of the drag knob enables a more easy and secure approach for the angler's hand, when compared for example with the arrangement suggested in U.S. Pat. No. 5,921,492, while preventing with the same effectiveness the knob from catching line. However, certain aspects of the invention are also applicable while using a drag knob substantially completely interposed behind the front spool wall of the reel and also while using a drag knob having five vanes. Further, according to certain aspects of the present invention the drag knob does not need necessarily to be arranged on the front side of the reel, but can be arranged also on its rear side at the frame, as for example suggested in U.S. Pat. No. 6,513,743. Such an arrangement or a vane-less drag knob similarly hidden in the handle hub as the cap 139*a* in the third embodiment of the present invention, could be favored for example by professional guides.

Modifications Concerning the Handle, the Spool, its Ventilation System and Other Related Reel Parts:

According to the embodiments of the present invention the handle of the reel can be with or without a protection ring. For ventilation purposes it could be enough, if at least the part of the frame protruding behind the spool arbor co-operates therewith to establish a kind of air turbine producing a transverse air ventilation stream along the line backing and the drag heat conducting parts during every rotation of the spool relative to the frame. Also the direction of the air stream produced by the air turbine is not limited to the example given above, and it is also clear that in case of smaller reels for lines up to classes 8 to 10, a forced ventilation by means of the aforementioned turbine might be not necessary, but remain more a question of personal preference. The same relates to the possible mounting of a reel clicker. If such a clicker should be mounted on an accessible side of the reel, an elastic element can be fixed for example, either to one of the pressing discs or to the part of the frame protruding into the spool so as to co-operate with opposite circumferential irregularities of the arbor wall, for example with the arbor bridges according to the seventh and eighth embodiment.

The invention claimed is:

1. A fly fishing reel, comprising:
   a spool being substantially freely rotatable in a reel-in direction and rotatable in a reel-off direction against a friction force of a drag;
   a handle for rotating said spool;
   a first drag control device, providing a frictional interconnection between the handle and the spool, the handle being operable to adjust the first drag control device to alter the friction force within a drag control range having a lower limit and an upper limit; and
   a second drag control device for adjusting at least the upper limit of the drag control range.

2. The reel according to claim 1, wherein the upper limit of the drag control range is represented by strength limits, the upper limit being 40 kp or less.

3. The reel according to claim 1, further comprising a common rotatable supporting element whereon the first and second drag control devices are arranged next to each other.

4. The reel according to claim 3, wherein the supporting element is rotatable only in reel-in direction, the spool is rotatable on the supporting element and is also able to be urged against the supporting element for creating a drag force, and the first drag control device comprises a drag control member, which can be axially slipped on the supporting element and then, by a subsequent rotation relative to the supporting element, be caught between a radially extending portion of the supporting element and the spool.

5. The reel according to claim 4, wherein the drag control member comprises a wedge-shaped member the tip portion of which forms a circumferential abutment portion for catching the radially extending portion of the supporting element.

6. The reel according to claim 5, wherein the wedge-shaped member is cut as a portion of a control sleeve, the sleeve serving as a slide bearing rotatably supporting the handle on the supporting element.

7. The reel according to claim 1, further comprising a stationary reel shaft which engages the drag control devices.

8. The reel according to claim 7, wherein the spool and the first drag control device are arranged within an axially restricted space so that a handle rotation relative to the spool causes a variation of the axial expansion of the first drag control device within a limited stroke so as to increase or decrease a basic drag force preset by the second drag control device.

9. The reel according to claim 1, wherein the second drag control device is arranged on the side of the reel opposite to the handle side.

10. The reel according to claim 1, wherein the second drag control device is arranged within a depression portion of the handle extending into the inner side of the spool arbor.

11. The reel according to claim 1, wherein the first drag control device causes a stroke controlling the biasing force of the frictional interconnection via a drag biasing device.

12. The reel according to claim 11, wherein the second drag control device either adjusts said stroke or shifts the drag control range along the characteristic curve of the drag biasing device.

13. The reel according to claim 11, wherein the drag biasing device has a progressive characteristic curve.

14. The reel according to claim 13, wherein the progressive characteristic curve preferably consists of a relatively flat ascending portion followed by a relatively steep ascending portion.

15. The reel according to claim 14, wherein the relatively flat ascending portion covers a biasing force causing a drag force in a range of not more than 0.5 to 0.7 kp and a stroke distance which does not exceed the biasing stroke distance of the steep ascending portion.

16. The reel according to claim 13, wherein the drag biasing device comprises a plurality of elastic members having the same or different characteristics and being arranged in parallel or in series to each other.

17. A fly fishing reel, comprising:
   a spool being substantially freely rotatable in a reel-in direction and rotatable in a reel-off direction against a friction force of a drag;
   a handle for rotating said spool;
   a first drag control device, providing a frictional interconnection between the handle and the spool, the handle being operable to adjust the first drag control device to alter the friction force within a drag control range having a lower limit and an upper limit; and
   a second drag control device for adjusting the upper limit of the drag control range while the lower limit of the drag control range remains substantially the same.

18. The reel according to claim 1, wherein the second drag control device adjusts the lower limit of the drag control range and the upper limit of the drag control range.

19. The reel according to claim 17, wherein the upper limit of the drag control range is represented by strength limits, the upper limit being 40 kp or less.

20. The reel according to claim 17, further comprising a common rotatable supporting element whereon the first and second drag control devices are arranged next to each other.

21. The reel according to claim 20, wherein the supporting element is rotatable only in reel-in direction, the spool is rotatable on the supporting element and is also able to be urged against the supporting element for creating a drag force, and the first drag control device comprises a drag control member, which can be axially slipped on the supporting element and then, by a subsequent rotation relative to the supporting element, be caught between a radially extending portion of the supporting element and the spool.

22. The reel according to claim 21, wherein the drag control member comprises a wedge-shaped member the tip portion of which forms a circumferential abutment portion for catching the radially extending portion of the supporting element.

23. The reel according to claim 22, wherein the wedge-shaped member is cut as a portion of a control sleeve, the sleeve serving as a slide bearing rotatably supporting the handle on the supporting element.

24. The reel according to claim 17, further comprising a stationary reel shaft which engages the drag control devices.

25. The reel according to claim 24, wherein the spool and the first drag control device are arranged within an axially restricted space so that a handle rotation relative to the spool causes a variation of the axial expansion of the first drag control device within a limited stroke so as to increase or decrease a basic drag force preset by the second drag control device.

26. The reel according to claim 17, wherein the second drag control device is arranged on the side of the reel opposite to the handle side.

27. The reel according of claim 17, wherein the second drag control device is arranged within a depression portion of the handle extending into the inner side of the spool arbor.

28. The reel according to claim 17, wherein the first drag control device causes a stroke controlling the biasing force of the frictional interconnection via a drag biasing device.

29. The reel according to claim 28, wherein the second drag control device either adjusts said stroke or shifts the drag control range along the characteristic curve of the drag biasing device.

30. The reel according to claim 28, wherein the drag biasing device has a progressive characteristic curve.

31. The reel according to claim 30, wherein the progressive characteristic curve preferably consists of a relatively flat ascending portion followed by a relatively steep ascending portion.

32. The reel according to claim 31, wherein the relatively flat ascending portion covers a biasing force causing a drag force in a range of not more than 0.5 to 0.7 kp and a stroke distance which does not exceed the biasing stroke distance of the steep ascending portion.

33. The reel according to claim 30, wherein the drag biasing device comprises a plurality of elastic members having the same or different characteristics and being arranged in parallel or in series to each other.

\* \* \* \* \*